(12) United States Patent
Jung et al.

(10) Patent No.: US 8,407,926 B2
(45) Date of Patent: Apr. 2, 2013

(54) OPTICAL TELESCOPE SIGHT COMBINING DOT SIGHT MODE AND SCOPE MODE

(76) Inventors: In Jung, Gyeonggi-do (KR); Dong Hee Lee, Gyeonggi-do (KR)

( * ) Notice: Subject to any disclaimer, the term of this patent is extended or adjusted under 35 U.S.C. 154(b) by 131 days.

(21) Appl. No.: 12/997,961

(22) PCT Filed: Jun. 18, 2009

(86) PCT No.: PCT/KR2009/003286
§ 371 (c)(1),
(2), (4) Date: Dec. 14, 2010

(87) PCT Pub. No.: WO2009/154419
PCT Pub. Date: Dec. 23, 2009

(65) Prior Publication Data
US 2011/0099881 A1 May 5, 2011

(30) Foreign Application Priority Data

Jun. 18, 2008 (KR) .................. 10-2008-0057340
Jun. 18, 2009 (KR) .................. 10-2009-0054348

(51) Int. Cl.
*F41G 1/38* (2006.01)
(52) U.S. Cl. .......................................... 42/125
(58) Field of Classification Search .......... 42/124, 42/125, 126, 127, 128
See application file for complete search history.

(56) References Cited

U.S. PATENT DOCUMENTS

| | | | |
|---|---|---|---|
| 2,644,237 A * | 7/1953 | Pachmayr | 42/128 |
| 3,732,642 A * | 5/1973 | Bray | 42/124 |
| 4,859,058 A | 8/1989 | Ekstrand | |
| 5,272,514 A | 12/1993 | Dor | |
| 5,493,450 A | 2/1996 | Ekstrand | |
| 7,246,461 B2 * | 7/2007 | Wooden | 42/125 |

FOREIGN PATENT DOCUMENTS

| | | |
|---|---|---|
| JP | 5 256595 A | 10/1993 |
| JP | 7 114085 A | 5/1995 |
| JP | 7 253549 A | 10/1995 |
| JP | 8 195902 A | 7/1996 |
| JP | 9 311281 A | 12/1997 |
| KR | 1995 0014916 | 6/1995 |
| WO | WO 2007 055143 A1 | 5/2007 |

OTHER PUBLICATIONS

Search Report for PCT/KR2009/003286, dated Feb. 17, 2010, 2 pages.

* cited by examiner

*Primary Examiner* — Stephen M Johnson
(74) *Attorney, Agent, or Firm* — Dority & Manning, P.A.

(57) ABSTRACT

The present invention relates to an optical device for both a dot sight mode and a scope mode, the optical device including: a dot-sight main body which is formed with a dot sight region where a light source and a reflective mirror are installed to display light emitted from the light source as a dot on an external target, and operates in the dot sight mode; and a scope structure which includes an objective lens and an eyepiece lens to magnify and see the external target, and is rotatable inside the dot-sight main body, the scope mode being selected when the scope structure is rotated and inserted in the dot sight region. With this, there is provided an optical device for both a dot sight mode and a scope mode, in which a scope structure is installed to be retractable inside a dot sight device and thus both the dot sight mode and the scope mode are supported, thereby aiming at an external target through quick mode switching, and there is no need for an additional scope device.

17 Claims, 35 Drawing Sheets

OPTICAL TELESCOPE SIGHT COMBINING DOT SIGHT MODE AND SCOPE MODE

CROSS REFERENCE TO RELATED APPLICATION

This application is the national stage entry of International Patent Application No. PCT/KR2009/003286 having a filing date of Jun. 18, 2009, which claims the filing benefit of Korean Patent Application Number 10-2008-0057340 having a filing dates of Jun. 18, 2008 and Korean Patent Application Number 10-2009-0054348 having a filing date of Jun. 18, 2009.

TECHNICAL FIELD

The present invention relates to an optical device for both a dot sight mode and a scope mode, and more particularly, to an optical device for both a dot sight mode and a scope mode, in which the dot sight mode and the scope mode can be easily switched to each other.

BACKGROUND ART

Generally, an optical device may be coupled to one side of a firearm so as to accurately aim an external target. In a particular case of a rifle among the firearms, aiming is achieved by aligning a line of sight between a front sight and a rear sight, in which speed showing how quickly the aiming is achieved to fire an aimed shot and accuracy showing how accurately the aimed shot hits the target are very important.

However, even a small shock or shake makes it difficult to align the line of sight, and it is disadvantageous for quick aiming requested at a short distance or in an urgent situation.

That is, an aimed-shooting method requires complicated procedures and time to acquire and ascertain a target, align the line of sight, aim at the target, etc. Also, because the front sight and the rear sight themselves are very small, not only they are susceptible to even a small shake, but also eyes are turned upon the front sight and the rear sight rather than the target or a frontward situation and therefore a field of view becomes narrow if excessive attention is paid to the alignment for the line of sight in order to accurately align the front sight and the rear sight.

Accordingly, an optical scope has been proposed to solve the above cumbersome alignment for the line of sight and improve the accuracy a little more.

The optical scope employs a magnifying-power optical system, which includes an objective lens and an objective lens reticle (i.e., the light of sight), to magnify a target, and is thus excellent in discerning the target, thereby enabling steady aiming through the reticle placed inside the scope.

Such an optical scope is broadly classified into a prism type and a relay lens type. FIG. 1 shows a structure of a prism type optical scope, and FIG. 2 shows a relay lens type optical scope.

First, referring to (a) of FIG. 1, the prism type optical scope includes an objective lens, a prism optical system, a reticle, an eyepiece lens, etc. FIG. 1 illustrates one sheet of the objective lens 12 and one sheet of the eyepiece lens 11, but many sheets of them are generally provided in practice to remove aberration or the like If an image of an external object from the objective lens is formed at a position of the reticle, both the image and the reticle are magnified and viewed through the eyepiece lens, which is the principle of a telescope or scope. At this time, if the image from the objective lens is directly formed at the position of the reticle, the image is viewed as it is inverted. Thus, a prism is provided between the objective lens and the reticle to erect the image viewed through the eyepiece lens by inverting the inverted image again.

Referring to FIG. 2, the relay lens type optical scope includes an objective lens, a field lens, a reticle, a relay lens, an eyepiece lens, etc. FIG. 2 illustrates one sheet of the objective lens, one sheet of the field lens and one sheet of the eyepiece lens, but many sheets of them are generally provided in practice to remove aberration or the like.

If an image of an external object from the objective lens is formed at a position of the reticle, both the image and the mark of the reticle are formed again in front of the eyepiece lens and magnified and viewed through the eyepiece lens, which is the principle of a relay lens type telescope. At this time, if the image from the objective lens is directly formed on the reticle, the image is generally viewed as it is inverted. This inverted image is formed once gain by the relay lens and thus inverted again, so that the image in front of the eyepiece lens can be erect. Then, this erect image is magnified and viewed through the eyepiece lens.

Here, the field lens placed before and after the relay lens serves to condense a pencil of light entering the relay lens.

However, the above optical scopes are also susceptible to even a small shake like the front sight and the rear sight, and it is therefore to impossible to quickly achieve the aiming.

To solve such a problem, there has been proposed an optical dot-sight device in which no magnification is applied to an optical sight and a simple dot of sight is used instead of a complicate line of sight.

The optical dot-sight device is characterized in that it is simple and quick aiming is possible. Also, it is disadvantageous for quick aiming requested at a short distance or in an urgent situation.

In other words, it takes little time to align the line of sight, the aiming itself is achieved by quickly moving a light point to a target, and the field of view is very effectively secured. Therefore, the optical dot-sight device is of merit to reduce not only the time taken in the aiming but also an obstacle based on the aiming to the field of view and a situation judgment.

FIG. 3 is a schematic view of an optical dot-sight device. Referring to FIG. 3, the optical dot-sight device 100 includes an adjuster 120 placed on a top of a cylindrical sighting housing 110 and aligning an internal tube body, a fastening grill 130 detachably coupled to a rifle rear sight module (not shown) placed under the housing 110 through a rail way, a protective window 140 placed inside the housing 110, a light emitting diode (LED) 150 placed at a predetermined position of an inner side of the tube body within the housing 110 and emitting light, and a reflective mirror 160 having a certain curvature and placed behind the protective window 140 within the housing 110.

Here, the reflective mirror 160 is coated to make an observer's (i.e., user's) eyes see through toward a front end of the optical dot-sight device 100 and reflect a beam dot of the LED 150 having a wavelength of about 650 nm. Thus, the reflective mirror 160 makes the observer's (i.e., user's) eyes see through toward the front end of the optical dot-sight device 100 and reflects the beam dot of the LED 150 having a wavelength of about 650 nm.

An observer (i.e., user) fires when the LED light point and a target are aligned, thereby facilitating the aiming. In more detail, it is intended that the beam dot generated by the LED 150 placed inside the optical dot-sight device 100 is reflected by the reflective mirror 160 and parallel enters the observer's eyes, and this parallel is aligned with a bullet shooting axis of a barrel.

If the parallel of the optical dot-sight device 100 is not aligned with the bullet shooting axis of the barrel, the target is missed even though the observer aligns the beam dot of the LED 150 with the target. Accordingly, to align the parallel of the optical dot-sight device 100 with the bullet shooting axis of the barrel, the adjuster 120 having vertical and horizontal functions for aligning an inner tube body is provided to align an optical axis of the inner tube body with the bullet shooting axis of the barrel.

However, the optical dot-sight device has no function of magnifying an external target like a scope device, and thus needs to additionally have the optical scope.

Also, as the scope device is separately provided, an external target has to be first acquired through the scope device and then aimed again through the optical dot-sight device.

DISCLOSURE

Technical Problem

Accordingly, the present invention is conceived to solve the forgoing problems, and an aspect of the present invention is to provide an optical device for both a dot sight mode and a scope mode, in which a scope structure is installed to be retractable inside a dot sight device and thus both the dot sight mode and the scope mode are supported, thereby aiming at an external target through quick mode switching.

Another aspect of the present invention is to provide an optical device for both a dot sight mode and a scope mode, in which there is no need for an additional scope device.

Technical Solution

In accordance with an aspect of the present invention, an optical device for both a dot sight mode and a scope mode includes: a dot-sight main body which is formed with a dot sight region where a light source and a reflective mirror are installed to display light emitted from the light source as a dot on an external target, and operates in the dot sight mode; and a scope structure which includes an objective lens and an eyepiece lens to magnify and see the external target, and is rotatable inside the dot-sight main body, the scope mode being selected when the scope structure is rotated and inserted in the dot sight region.

The scope structure may include a scope tube body in which the objective lens and the eyepiece lens are installed, and a scope shaft installed to be rotatable inside the dot-sight main body and rotating the scope tube body as being coupled with the scope tube body.

The scope tube body may include a tube body unit in which the objective lens and the eyepiece lens are installed, and a boss unit formed to be coupled with the scope shaft.

The optical device may further include a rotation means which is installed at one side of the scope structure and rotates the scope structure.

The rotation means may include a rotation unit coupled to and interlocking with the scope shaft, an interlock unit coupled to and interlocking with the rotation unit, and a pivot unit installed in the dot-sight main body and rotating the interlock unit as being coupled to and interlocking with the interlock unit.

The optical device may further include a position control means which is disposed at one side of the scope structure, and controls an inserting position so that the scope tube body is placed in the dot sight region when the scope tube body rotates.

The position control means may include a first stopper which is coupled to and interlocks with the scope shaft; a second stopper which formed with a recessed receiving groove to receive the first stopper and comes in contact with the first stopper received in the receiving groove; and a spring which is coupled to the second stopper and supported inside the dot-sight main body, and elastically supports the second stopper pressed as the first stopper received in the receiving groove rotates.

The rotation means may further include an elastic member which makes the scope structure rotate by elastic restoring force when the scope structure rotates toward the dot sight region of the dot-sight main body.

The boss unit of the scope tube body may be formed with a recessed supporting groove, and the rotation means may further include a rotation unit rotating with respect to a lever shaft formed inside the dot-sight main body and supporting one side of the supporting groove to elastically compress the elastic member.

The boss unit of the scope tube body may be formed with a recessed supporting groove, and the rotation means may include a rotation unit installed to be movable inward and outward with regard to the dot-sight main body, and presses one side of the supporting groove to elastically compress the elastic member when the rotation unit moves inward.

The rotation means may further include a pivot lever coupled to the scope shaft and rotating the scope shaft, and a fixing unit coupled to the pivot lever and restricting rotation of the scope shaft when the elastic member is elastically compressed in accordance with positions of the scope tube body.

The rotation means may include a pivot lever rotation with respect to a lever shaft formed inside the dot-sight main body, and the elastic member includes a leaf spring having one side coupled to the lever shaft and the other side coupled to the scope tube body and elastically biased in one direction, the scope tube body being rotated by elasticity of the leaf spring when the pivot lever rotates.

The rotation means may include a wire having one end wound on the scope shaft, and an adjusting unit coupling with the other end of the wire and rotating the scope tube body by adjusting the length of the wire.

The adjusting unit may further include a fixing unit configured to fix the wire when the elastic member is elastically compressed in accordance with rotated positions of the scope tube body.

The rotation means may include a driving motor coupled to rotate the scope tube body toward the dot sight region.

The rotation means may include a first terminal installed in the boss unit, and second and third terminals having electric polarities and installed within the dot-sight main body, and the scope tube body may be rotated by electromagnetic force between the first terminal and the second terminal and electromagnetic force between the first terminal and the third terminal.

A mode switching protrusion may be formed inside the dot-sight main body and guiding a rotated position of the scope tube body.

The boss unit of the scope tube body may be formed with an elongated hole formed long in a lengthwise direction of the boss unit to move the scope shaft along the boss unit.

A spring may be installed inside the elongated hole and elastically supports the scope shaft to move toward the scope tube body when the scope tube body comes in contact with the protrusion.

If a reflective mirror provided in the dot-sight main body is configured as a doublet, a first surface and a second surface among three surfaces may satisfy the following (expression 1)

$$D_1 = \frac{n-1}{R_1}, D_2 = \frac{1-n}{R_3}$$ (Expression 1)

$$D_1 + D_2 - \frac{d}{n} D_1 D_2$$

(where, a distance (i.e., a central thickness) between the first surface and the third surface of the doublet is d, a curvature of the first surface is R1, a curvature of the third surface is R3, and a reflective index of material is n, At this time, D1 indicates the refractive index of the first surface, and D3 indicates the refractive index of the first surface).

Advantageous Effects

In accordance with an aspect of the present invention, there is provided an optical device for both a dot sight mode and a scope mode, in which a scope structure is installed to be retractable inside a dot sight device and thus both the dot sight mode and the scope mode are supported, thereby aiming at an external target through quick mode switching.

In accordance with an aspect of the present invention, there is provided an optical device for both a dot sight mode and a scope mode, in which there is no need for an additional scope device.

BEST MODE

Figure 1:
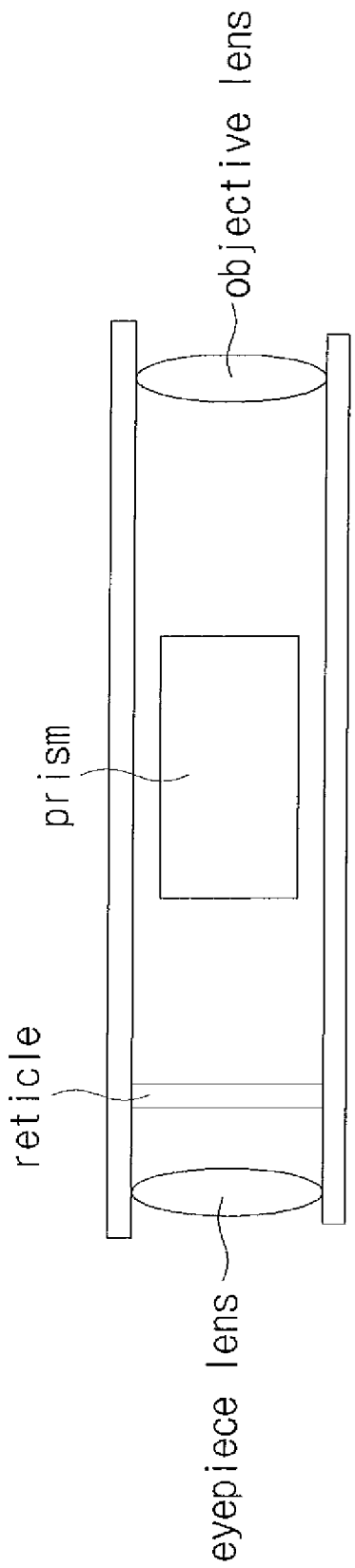
FIG. 1 is a structural view of a prism type optical scope.
Figure 2:
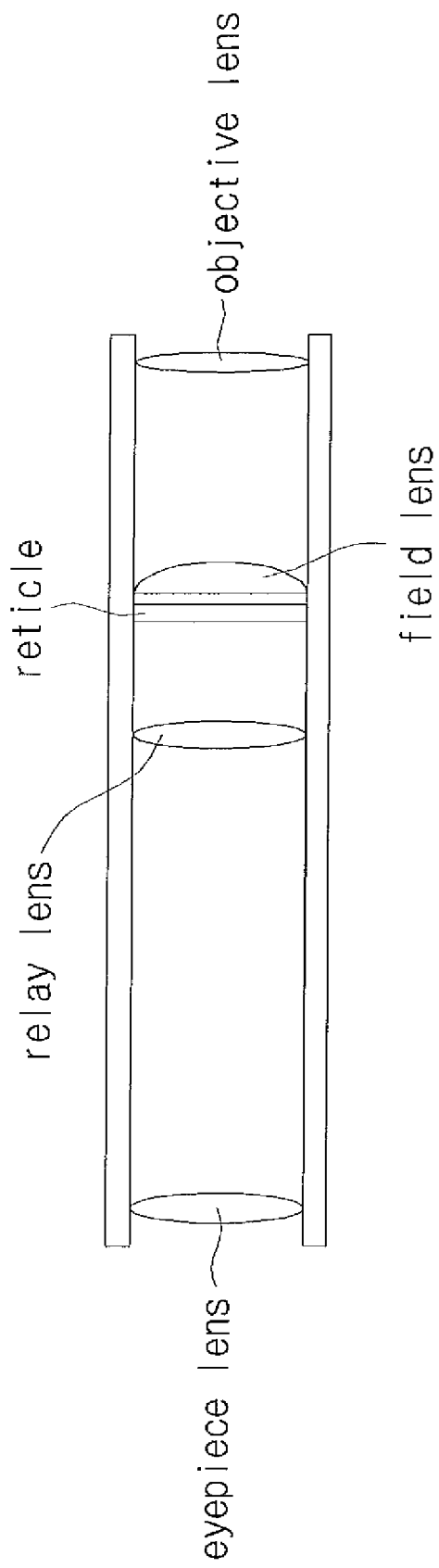
FIG. 2 is a structural view of a relay type optical scope.
Figure 3:
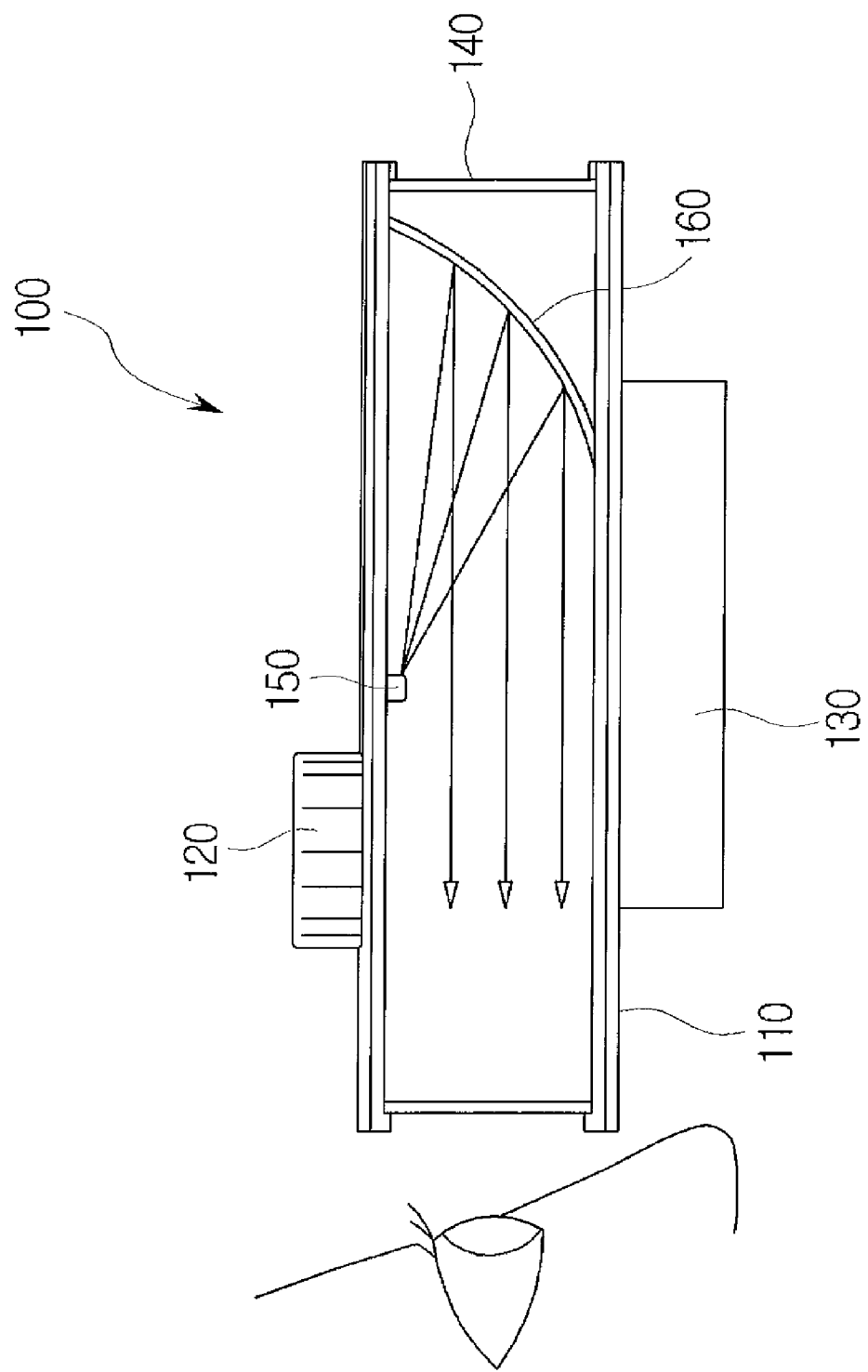
FIG. 3 is a schematic view of an optical dot-sight device.

Prior to description, elements will be representatively explained in an embodiment and only different configurations will be described in other embodiments, in which like reference numerals refer to like elements throughout the embodiments.

Hereinafter, an optical device for both a dot sight mode and a scope mode according to a first exemplary embodiment of the present invention will be described with reference to the accompanying drawings.

Figure 4:
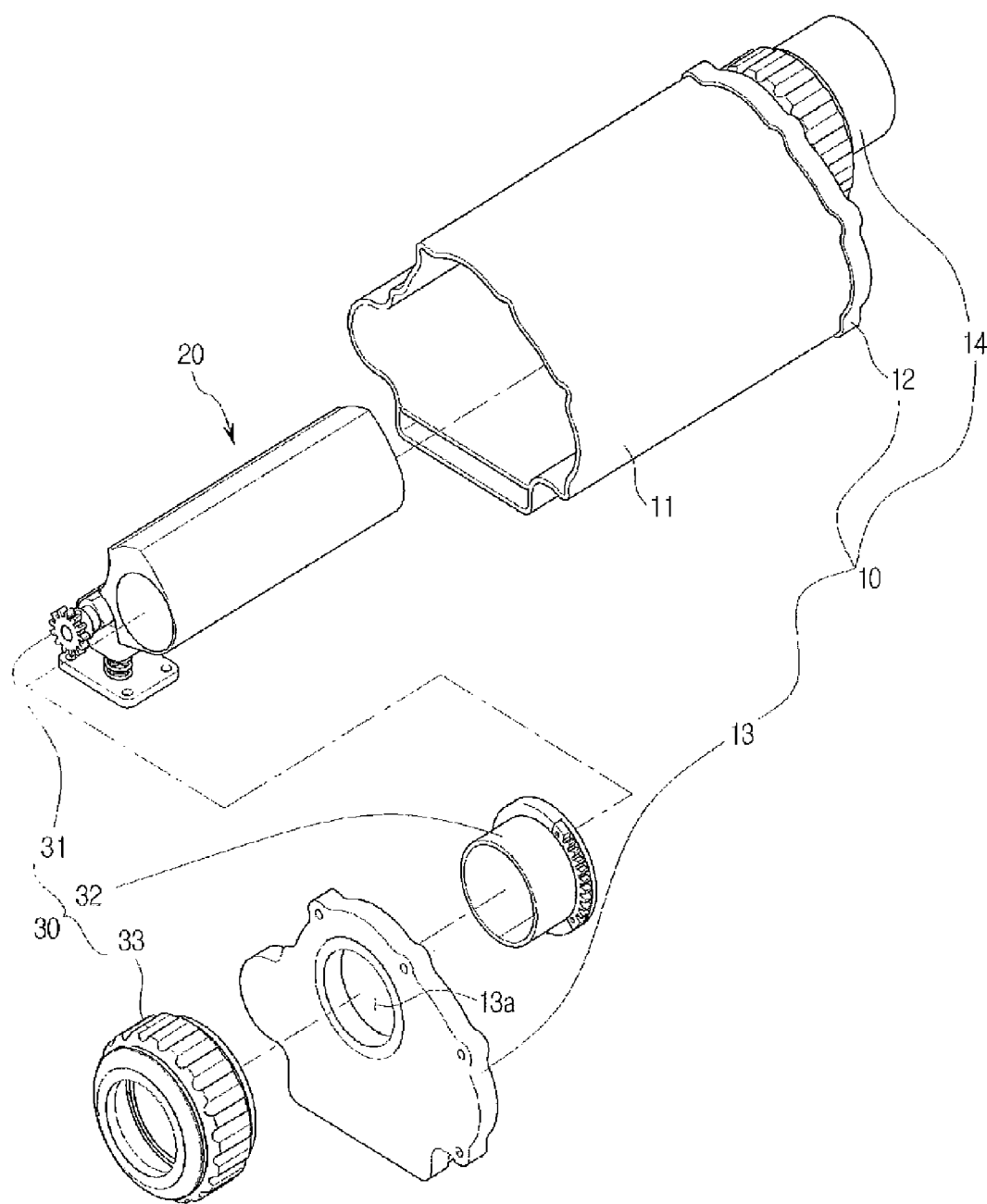
FIG. 4 is an exploded perspective view of an optical device for both a dot sight mode and a scope mode according to a first exemplary embodiment of the present invention.

FIG. 4 is an exploded perspective view of an optical device for both a dot sight mode and a scope mode according to a first exemplary embodiment of the present invention. Referring to FIG. 4, the optical device for both the dot sight mode and the scope mode according to the first exemplary embodiment of the present invention includes a dot-sight main body 10, a scope structure 20, a rotation means 30, a position control means 40.

The dot-sight main body 10 includes a tube body housing 11, brackets 12 and 13, and a reflective mirror housing 14.

The tube body housing 11 is formed to have a hollow shape for serving as a tube body of a sight, of which an outside bottom is formed to be coupled to a firearm and a certain inner area is provided with a light source unit (not shown) having a light emitted diode (LED) as a light source.

At this time, a region between an accommodating hole 13a to be described later and a reflective mirror housing 14 may be defined as a dot sight region where the dot sight mode is achieved by the light source unit and the reflective mirror in the dot sight mode.

The brackets 12 and 13 are coupled to a front end part and a rear end part of the tube body housing 11, respectively.

Here, the bracket 12 coupled to the front end part is formed with a predetermined hole to couple with the reflective mirror housing 14 to be describe later and keep an eye frontward, and the bracket 13 coupled to the rear end part is formed with the accommodating hole 13a to coupled with the rotation means 30 to be described later.

The reflective mirror housing 14 is coupled to the bracket 13, and provided with a reflective mirror for reflecting light emitted from the light source unit installed inside the tube body housing 11.

At this time, the reflective mirror housing 14 may be parallel coupled with a rotation handle the rotation means 30 to be described later. With such a configuration of the dot-sight main body 10, the optical device operates in the dot sight mode.

Figure 5:
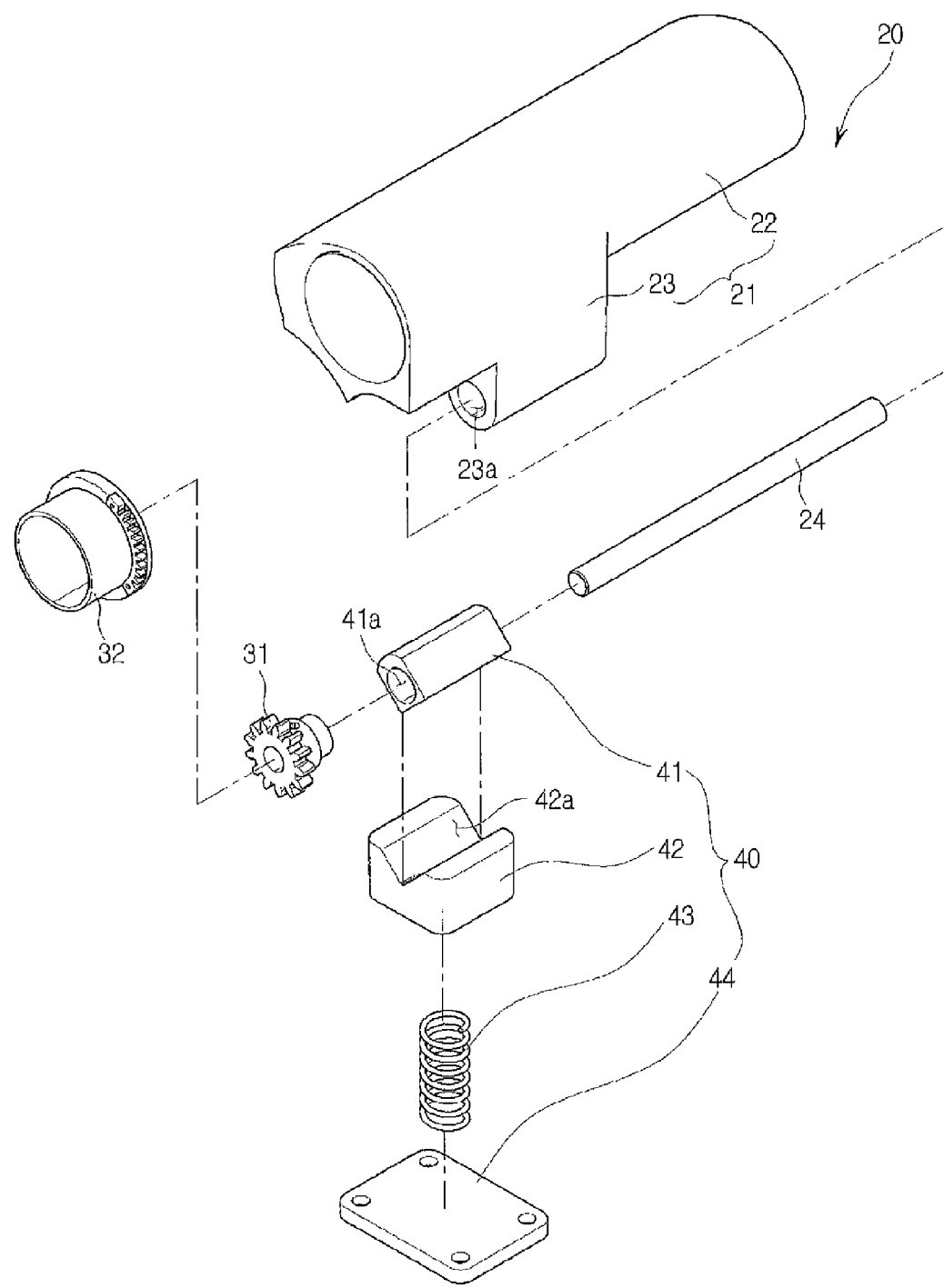
FIG. 5 is an exploded perspective view of a scope structure, a rotation means, and a position control means of FIG. 4.

FIG. 5 is an exploded perspective view of a scope structure, a rotation means, and a position control means of FIG. 4. Referring to FIG. 5, the scope structure 20 includes a scope tube body 21 and a scope shaft 24, and is placed inside the tube body housing 11 of the dot-sight main body 10.

The scope tube body 21 includes a tube body unit 22 in which either of the prism type or relay lens type scope as described in the related art is installed, and a boss unit 23 coupled to one side of the tube body unit 22.

The boss unit 23 is formed with a coupling hole 23a to which the scope shaft 24 to be described later is coupled.

The scope shaft 24 is shaped like a bar elongated in one direction, and inserted in and coupled to the coupling hole 23a. Thus, the scope shaft 24 is installed as being supported on a predetermined inner part of the tube body housing 11 and rotatable.

The rotation means 30 includes a rotation unit 31, an interlock unit 32, and a pivot unit 33.

The rotation unit 31 is shaped like a predetermined gear, and coupled to a rear end part of the scope shaft 24.

The interlock unit 32 is a member prepared to be engaged with the rotation unit 31, which is coupled to the pivot unit 33 to be described later.

The pivot unit 33 couples with the interlock unit 32 through the accommodating hole 13a formed in the bracket 13 of the dot-sight main body 10.

That is, if a predetermined rotational force is applied to the pivot unit 33, the interlock unit 32 rotates and thus the rotation unit 31 rotates, so that the scope shaft 24 can rotate to thereby rotating the scope tube body 21.

In result, the scope tube body 21 rotates with respect to the scope shaft 24 and is thus inserted in the dot sight region of the tube body housing 11, so that the optical device can be switched to the scope mode.

The position control means 40 includes a first stopper 41, a second stopper 42, a spring 43, and a supporter 44.

The first stopper 41 is approximately shaped like a rectangular parallelepiped, and includes at least three rectangular edges. Also, the first stopper 41 is internally formed with a hole 41a to be coupled with the scope shaft 24, thereby coupling with the scope shaft 24.

The second stopper 42 is formed with a receiving groove 42a having an approximate "V" shape to receive one side of the first stopper 41, and installed to come in contact with a rectangular outer surface of the first stopper 41.

That is, when the first stopper 41 received in the receiving groove 42a rotates clockwise or counterclockwise, the rectangular outer surface of the first stopper 41 is received in the receiving groove 42a, so that the rotation of the first stopper 41 can be restricted and the scope structure 20 interlocking with this can be also controlled to be precisely positioned in accordance with positions where the first stopper 41 is received in the receiving groove 42a.

The spring 43 is a member coupled to a lower part of the second stopper 42 so as to elastically support the second stopper 42, which comes in contact with the first stopper 41 when the first stopper 41 rotates, to be pressed and moved downward. The spring 43 couples with the inside of the tube body housing 11 or the supporter 44 provided separately. In the accompanying drawing, it is illustrated that the supporter 44 is separately installed.

Through the position control means 40, the first stopper 41 rotates when the scope shaft 24 rotates, so that the spring 43 can elastically support the second stopper 42 forced to move down by the first stopper 41 when rotating.

Then, at the same time when the rotation of the first stopper 41 is completed, i.e., when the first stopper 41 comes in contact with and is received in the receiving groove 42a, the second stopper 42 returns to its original position by the elastic restoring force of the spring 43, thereby restricting the rotation of the first stopper 41.

In result, it is possible to precisely determine the rotated position of the scope shaft 24 interlocking with the first stopper 41 and the second stopper 42.

Here, the precise position of the scope structure 20 when switched into the scope mode is a position where an optical axis in the dot sight mode, i.e., the optical axis through the rotation handle and the reflective mirror is aligned with the optical axis of the scope structure 20.

This exemplary embodiment describes that the first stopper 41 is shaped like an approximately rectangular parallelepiped, but not limited to a rectangular shape.

For example, the first stopper 41 may be provided in the form of a trigonal prism, and the receiving groove 42a may come in contact with an outer surface of the trigonal prism of the first stopper 41.

That is, the first stopper 41 and the second stopper 42 come into contact with each other to determine the rotated position of the scope shaft 24, i.e. the position of the scope tube body 21 so that the scope structure 20 can be placed between the rotation handle 33 and the reflective mirror housing 13.

Although it is not shown, a power controller may be separately provided in a predetermined inner or outer side of the dot-sight main body 10. The power controller is electrically connected to the light source unit provided inside the tube body housing 11, and installed to turn on/off the light source unit.

That is, there is no need for the light source in the scope mode of the optical device, so that power supplied to the light source unit can be cut off by the power controller at a point of time when the scope tube body 21 is inserted in the dot sight region, i.e., when switched into the scope mode.

Further, at a point of time when the scope tube body 21 comes out of the dot sight region as the pivot unit 33 rotates, i.e., when switched into the dot sight mode, the light source unit is supplied with power.

That is, ether of the scope mode or the dot sight mode is selected according to the positions of scope tube body 21, and at this time the power controller turns on/off the light source unit in accordance with the selected mode.

Henceforth, operations of the foregoing optical device for both the dot sight mode and the scope mode will be described.

FIGS. 6 to 10 are operation views of the optical device for both the dot sight mode and the scope mode according to the first exemplary embodiment of the present invention.

Figure 6:
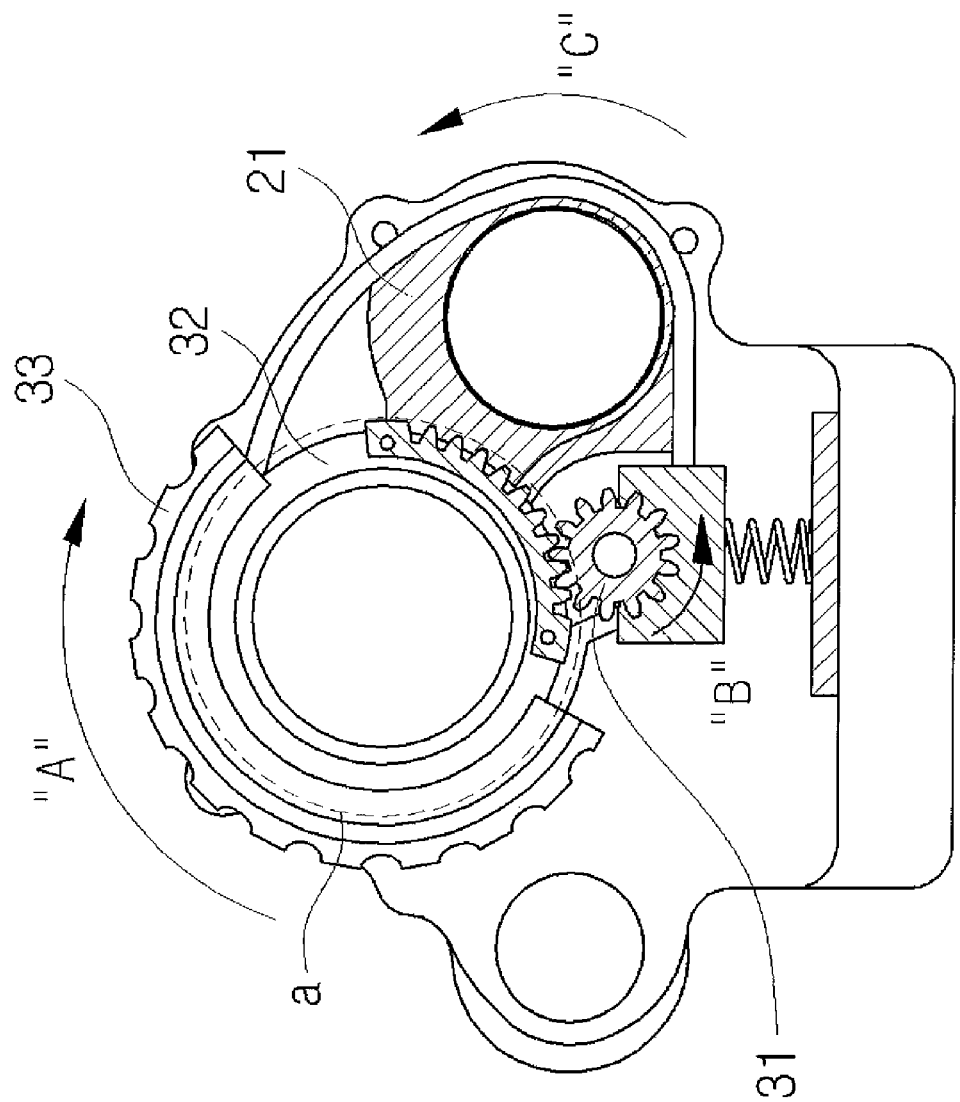
FIGS. 6 to 9 are operation views of the optical device for both the dot sight mode and the scope mode according to the first exemplary embodiment of the present invention.
Figure 7:
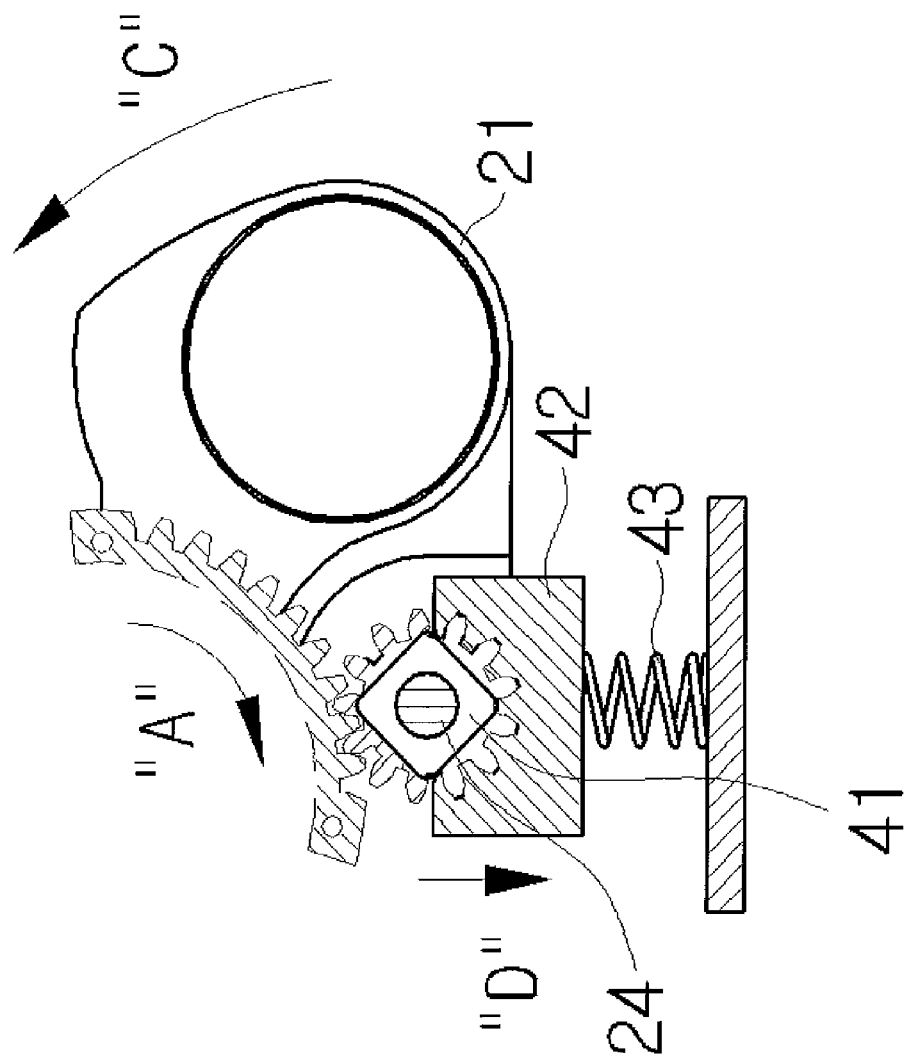

FIG. 6 illustrates that the scope tube body 21 is in the dot sight mode, i.e., in the state that the pivot unit 33 comes out of the dot sight region a.

At this time, the first stopper 41 of the position control means 40 is received in the receiving groove 42a of the second stopper 42.

In this state, if a user rotates the pivot unit 33 in a direction of "A", the interlock unit 32 interlocking with this also rotates in the direction of "A" and the rotation unit 31 engaged with the interlock unit 32 rotates in a direction of "B".

At the same time, the scope shaft 24 coupling with the rotation unit 31 rotates in a direction of "C", so that the scope tube body 21 rotates to be inserted in the dot sight region a.

As shown therein, the first stopper 41 coupling with the scope shaft 24 is also rotated, and at this time the outer surface of the rotating first stopper 41 presses one side of the receiving groove 42a of the second stopper 42, so that the second stopper 42 moves downward, i.e., in a direction of "D" and thus the spring 43 is elastically compressed.

Figure 8:
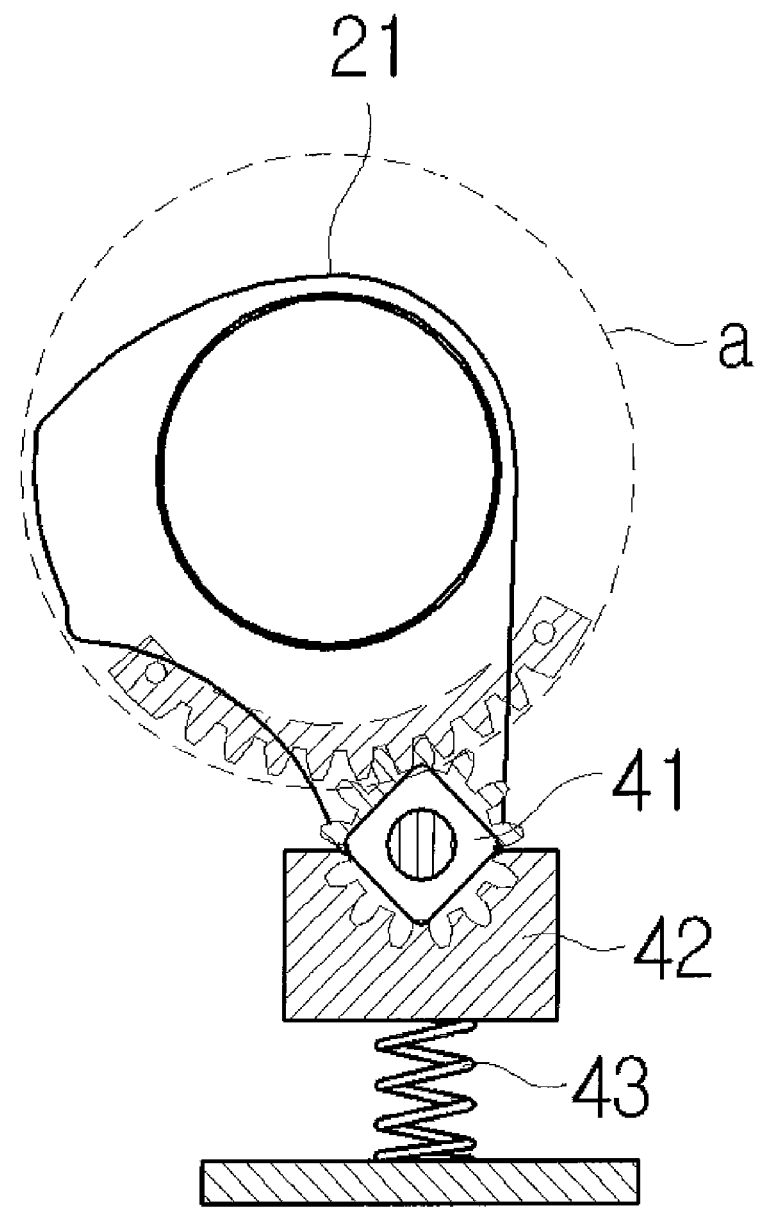

Then, as shown in FIG. 8, at a point of time when the rotation of the first stopper 41 is completed, i.e., when the first stopper 41 is received in the receiving groove 42a of the second stopper 42, the spring 43 is elastically restored in a direction opposite to the direction of "D" and restricts the rotated angle of the first stopper 41, thereby restricting the rotation of the scope shaft 24 too.

Figure 9:
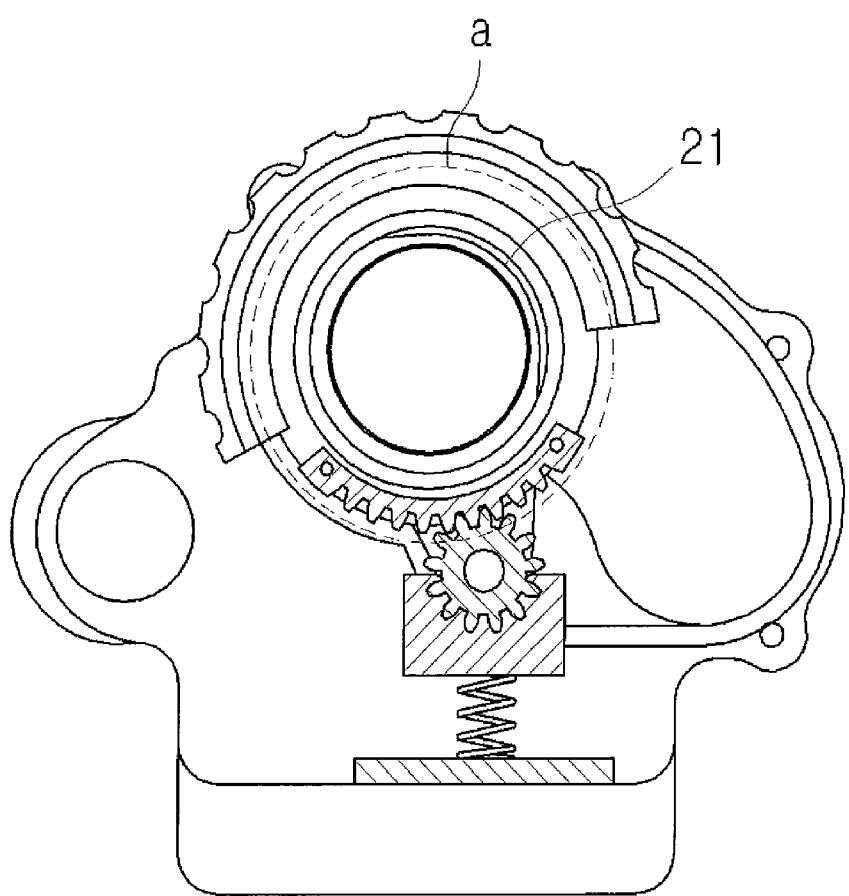
Figure 10:
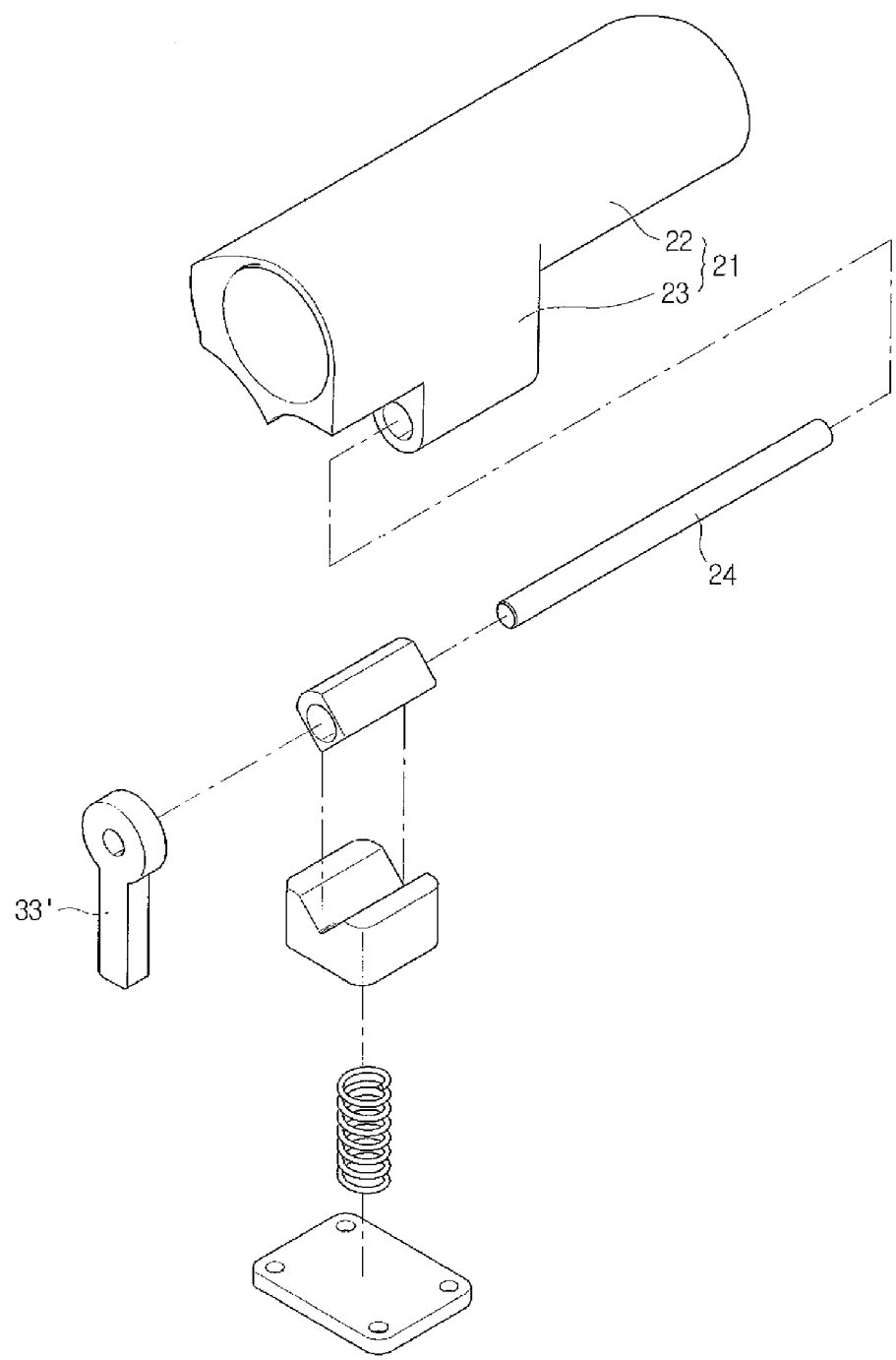
FIG. 10 is an exploded perspective view of the optical device for both a dot sight mode and a scope mode according to an alternative example of the first exemplary embodiment of the present invention.

Through this, as shown in FIG. 9, the scope tube body 21 is precisely positioned between the rotation handle 33 and the reflective mirror housing 14, and thus the optical axis of the dot sight mode and the optical axis of the scope structure are aligned with each other to thereby be switched into the scope mode.

Likewise, the switching to the dot sight mode is achieved by rotating the pivot unit 33 in a direction opposite to the direction of "A", and thus the foregoing elements are operated in reverse order, thereby making the scope tube body 21 come out of the dot sight region a.

That is, if the scope tube body 21 rotates and comes out of the dot sight region a, the optical device is switched into the dot sight mode.

Meanwhile, the power controller turns on/off the light source unit in accordance with the mode selected by the rotated position of the scope tube body 21 that is inserted in and come out of as described above.

In other words, when the scope tube body 21 rotates and enters the dot sight region a, the optical axis of the scope tube body 21 is aligned with the optical axis of the dot sight region a, and therefore the power controller cuts off the power supplied to the light source unit.

Also, when the scope tube body 21 rotates in the opposite direction as described above and comes out of the dot sight region a, the power controller supplies the power to the light source unit.

MODE FOR INVENTION

Next, an optical device for both a dot sight mode and a scope mode according to a second exemplary embodiment of the present invention will be described.

Figure 11:
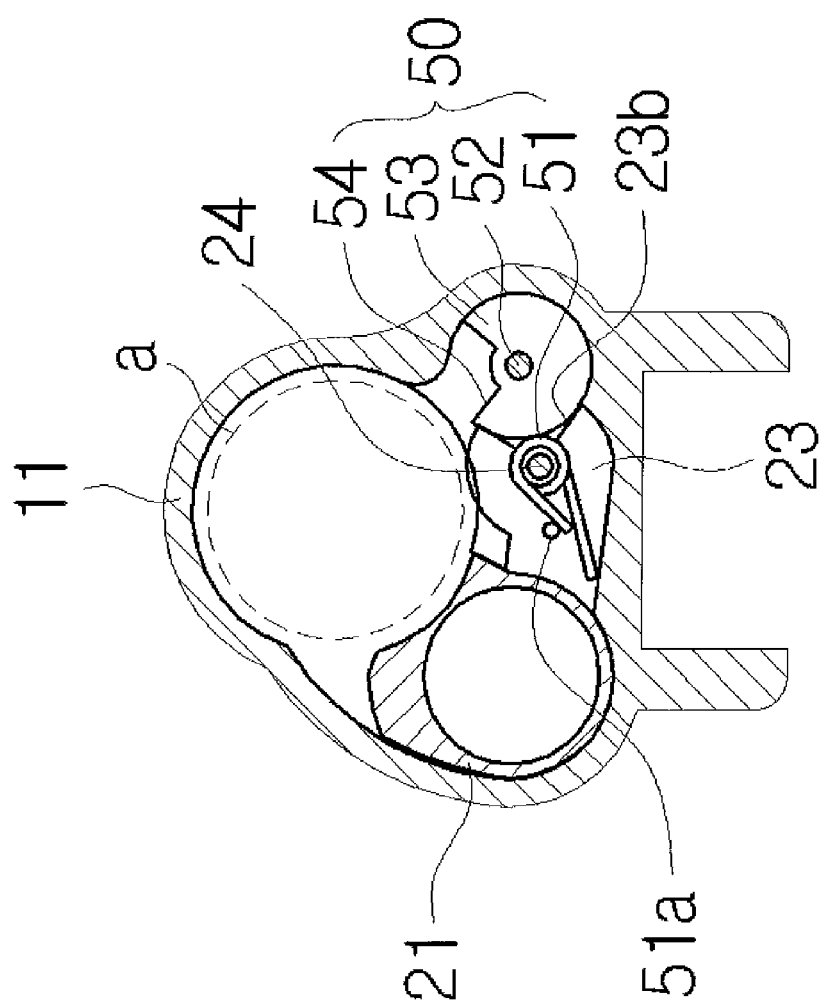
FIG. 11 is a schematic view of an optical device for both a dot sight mode and a scope mode according to a second exemplary embodiment of the present invention.

The optical device of the second exemplary embodiment is the same as that of the first exemplary embodiment except that the position control means is omitted, and the shapes of the rotation means and the boss unit of the scope tube body are changed. FIG. 11 is a schematic view of an optical device for both a dot sight mode and a scope mode according to a second exemplary embodiment of the present invention.

Referring to FIG. 11, the boss unit 23 is formed with a recessed supporting groove 23b.

At this time, the rotation means 50 includes an elastic member 51 and a rotation unit 53. The elastic member 51 is a predetermined spring coupled to the scope shaft 24, which includes one side supported by the tube body housing 11 and the other side supported by a support pin 51a protruding from the boss unit 23.

The rotation unit 53 is installed inside the tube body housing 11 so as to rotate with respect to a lever shaft 52 coupled to a predetermined pivot lever (not shown), and also installed at a side of the boss unit 23.

Also, the rotation unit 53 is formed with a supporting unit 54 at one side thereof to support the supporting groove 23b of the boss unit 23, so that the elastic member 51 is elastically compressed when the supporting unit 54 supports the supporting groove 23b.

Figure 12:
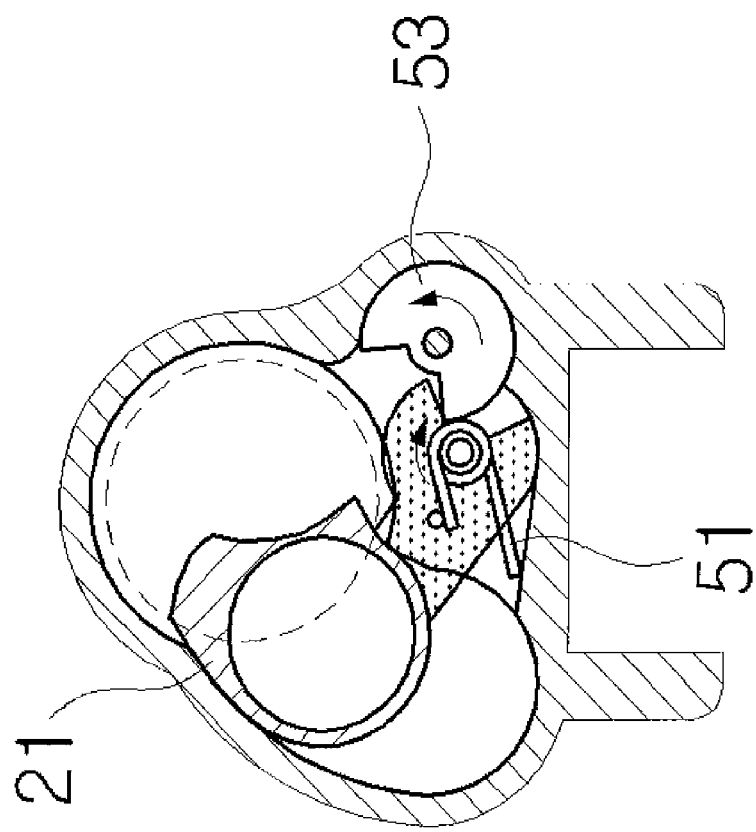
FIGS. 12 and 13 are operation views of the optical device for both the dot sight mode and the scope mode according to the second exemplary embodiment of the present invention.
Figure 13:
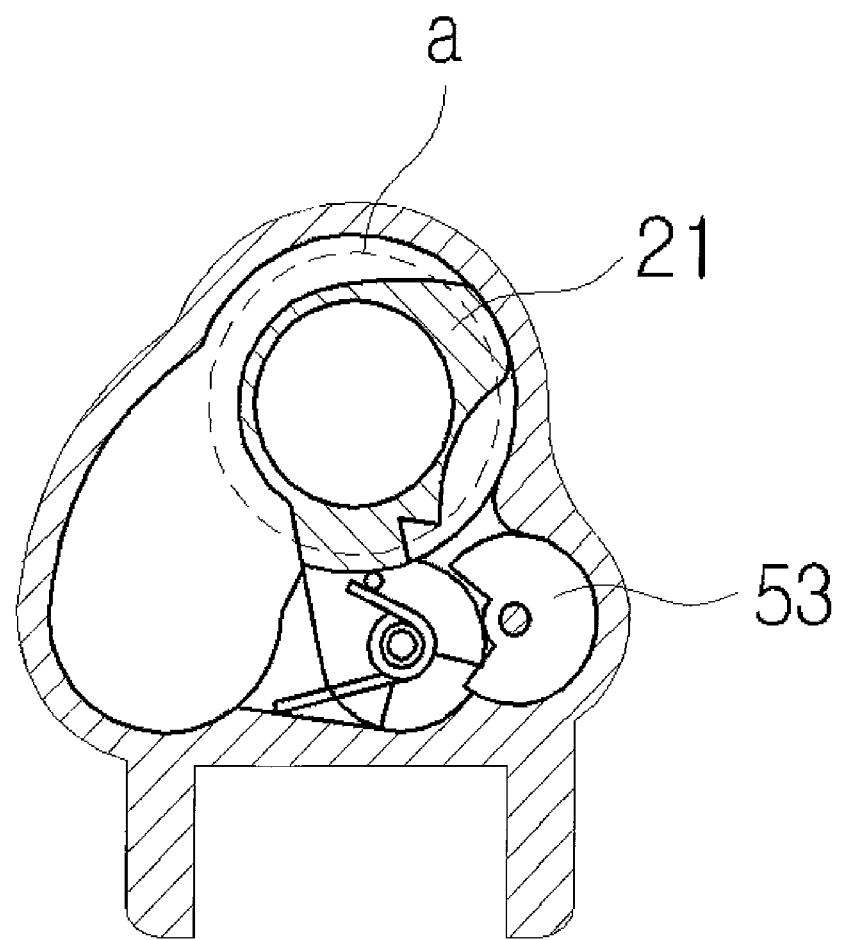

FIGS. 12 and 13 are operation views of the optical device for both the dot sight mode and the scope mode according to the second exemplary embodiment of the present invention.

In an initial state, the elastic member 51 is being elastically compressed when the supporting unit 54 of the rotation unit 53 supports the supporting groove 23b of the boss unit 23. Then, if the rotation unit 53 rotates counterclockwise, the elastic member 51 supported through the supporting unit 54 as shown in FIG. 12 is elastically restored and at the same time the boss unit 23 rotates clockwise, thereby rotating the scope tube body 21 to be inserted in the dot sight region a as shown in FIG. 13, and switching to the scope mode.

In the scope mode, the scope tube body 21 is supported by the elasticity of the elastic member 51.

On the other hand, if the rotation unit 50 rotates clockwise and the supporting unit 54 supports the supporting groove 23, the elastic member 51 is elastically compressed again and at the same time the scope tube body 21 returns to its original position, thereby switching the mode of the optical device to the dot sight mode.

Figure 14:
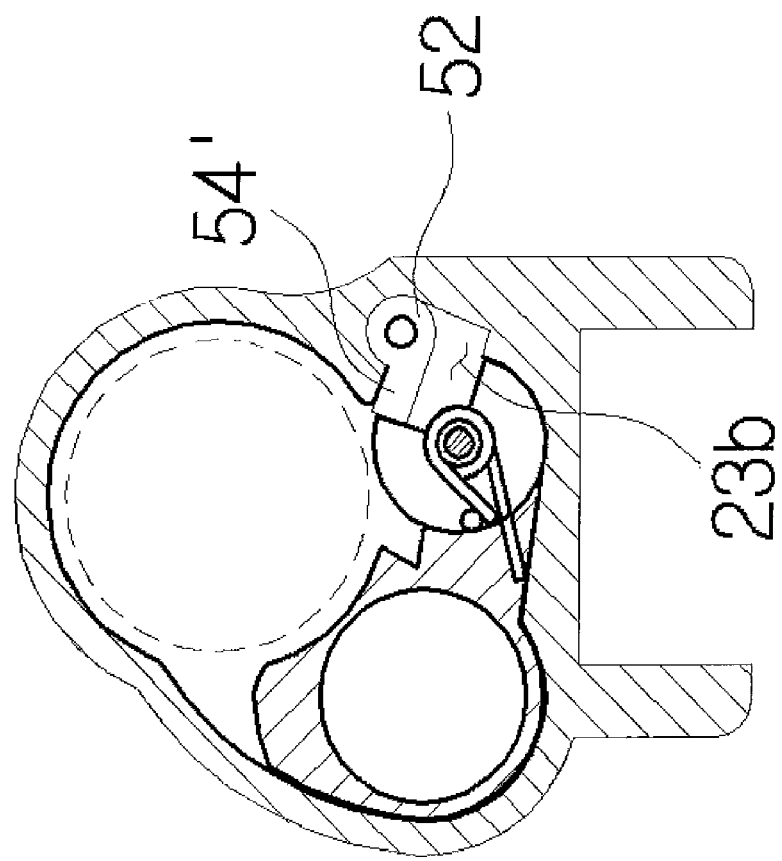
FIG. 14 is a schematic view of the optical device for both a dot sight mode and a scope mode according to a first alternative example of the second exemplary embodiment of the present invention.

FIG. 14 is a schematic view of the optical device for both a dot sight mode and a scope mode according to a first alternative example of the second exemplary embodiment of the present invention, which illustrates a different shape of the rotation unit.

As shown in FIG. 14, a supporting unit 54' of the rotation unit 52 is relatively small as compared with that of the second exemplary embodiment.

That is, the supporting unit formed in the rotation unit 52 is formed to support the rotation of the boss unit 23 regardless of its size while coming in contact with the supporting groove 23b formed in the boss unit 23.

Figure 15:
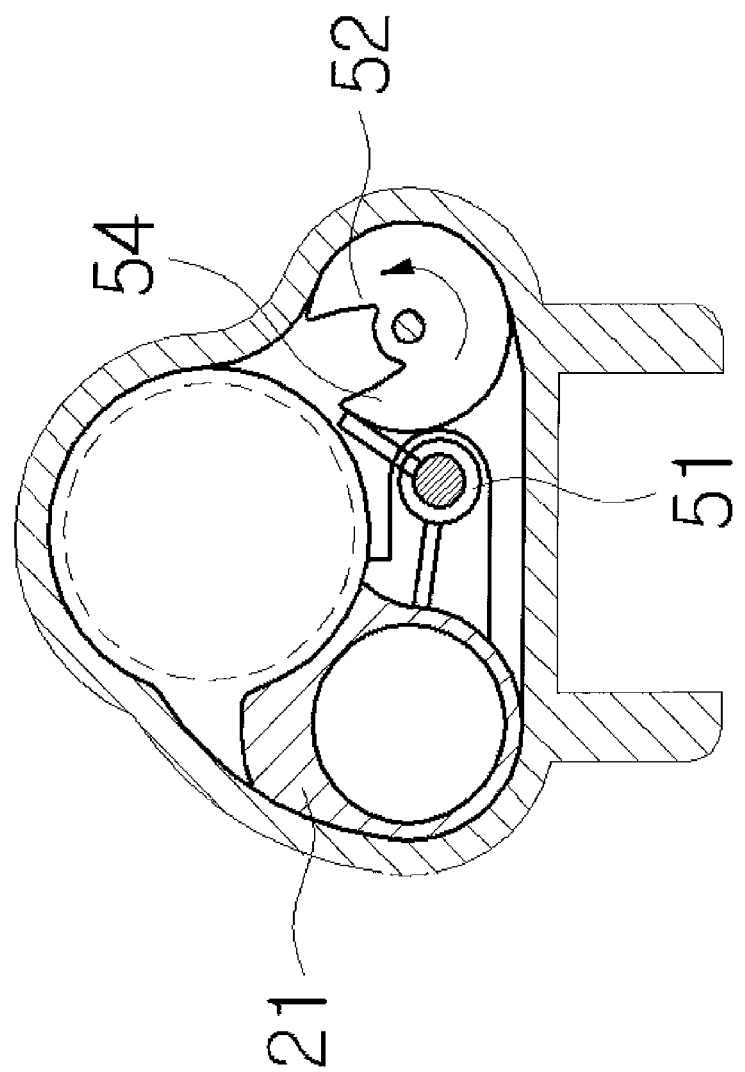
FIGS. 15 and 16 are schematic views of the optical device for both a dot sight mode and a scope mode according to a second alternative example of the second exemplary embodiment of the present invention.

FIG. 15 is a schematic view of the optical device for both a dot sight mode and a scope mode according to a second alternative example of the second exemplary embodiment of the present invention.

Referring to FIG. 15, the second alternative example of the second exemplary embodiment is different from the second exemplary embodiment in a supported part of the elastic member 51.

That is, the elastic member 51 according to the second alternative example includes one side fixed to the scope tube body 21, and the other side to come in contact with the supporting unit 54 of the rotation unit 53.

Figure 16:
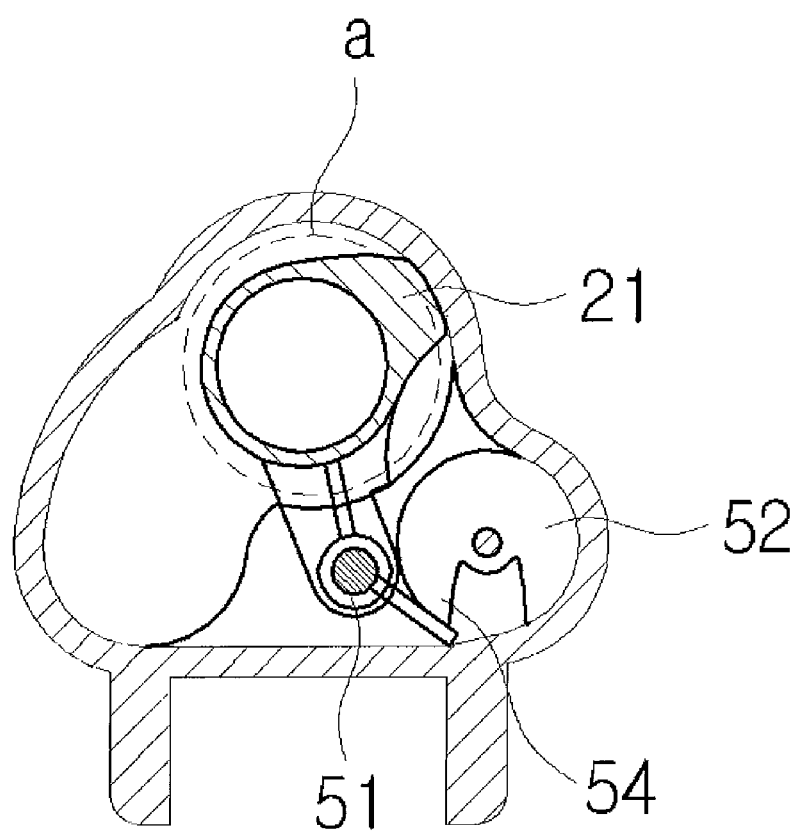

Thus, the rotation unit 53 presses one side of the elastic member 51 being in contact when rotating, so that the scope tube body 21 rotates toward the dot sight region as shown in FIG. 16, thereby switching to the scope mode. At this time, the side of the elastic member 51, pressed by the rotation unit 53, comes in contact with the inside of the scope tube housing 11 and thus it is compressed.

Also, the scope tube body comes out of the dot sight region by the elasticity of the elastic member 51, thereby switching the mode of the optical device to the dot sight mode.

Figure 17:
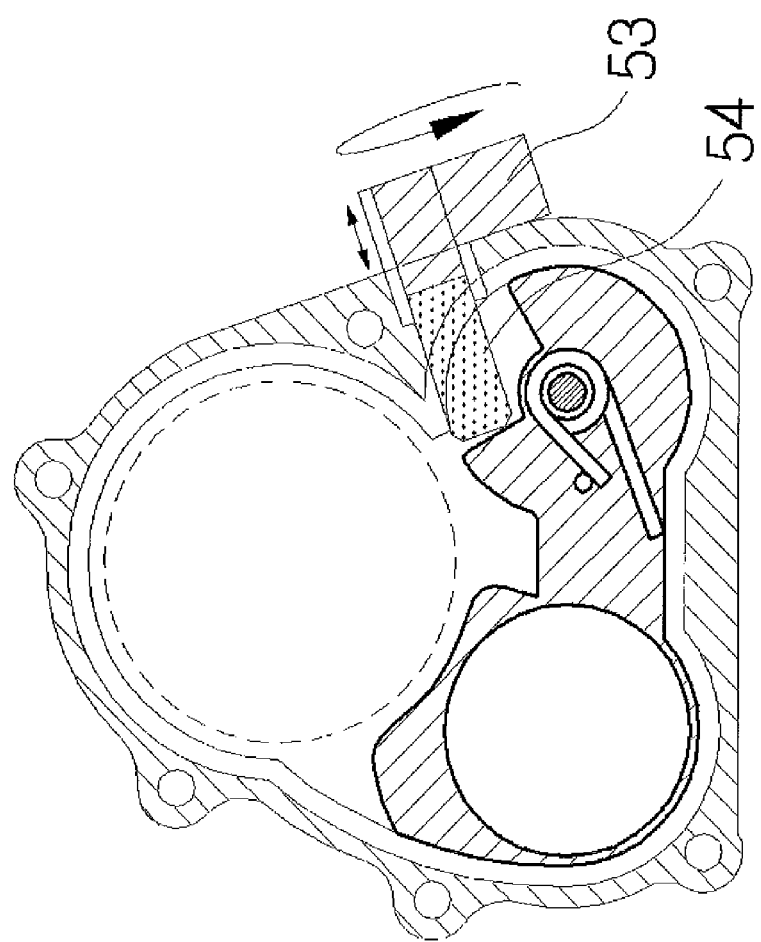
FIG. 17 is a schematic view of the optical device for both a dot sight mode and a scope mode according to a third alternative example of the second exemplary embodiment of the present invention.

FIG. 17 is a schematic view of the optical device for both a dot sight mode and a scope mode according to a third alternative example of the second exemplary embodiment of the present invention.

Referring to FIG. 17, the third alternative example of the second exemplary embodiment is different from the second exemplary embodiment in a position of the rotation unit included in the rotation means.

That is, the rotation means 50 includes a rotation unit 53 coupled to be movable inward or outward at a lateral side of the tube body housing 11, and the rotation unit 53 includes a supporting unit 54 at one side thereof.

The supporting unit 54 presses one side of the supporting groove 23b of the boss unit when moving inward, so that the elastic member 51 can be elastically compressed.

That is, interaction between the supporting unit 54 movable inward and outward and the elastic member 51 causes the scope tube body 21 to be inserted in or come out of the dot sight region a.

Next, an optical device for both a dot sight mode and a scope mode according to a third exemplary embodiment of the present invention will be described.

Figure 18:
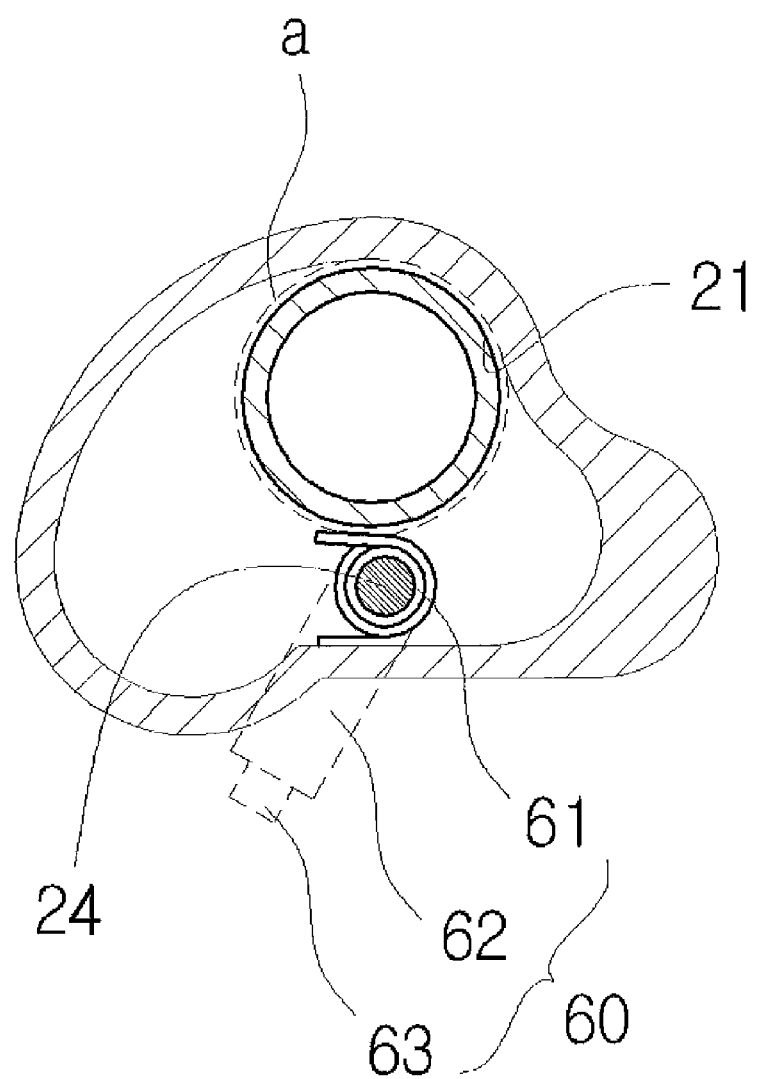
FIGS. 18 and 19 are schematic and operation views of an optical device for both a dot sight mode and a scope mode according to a third exemplary embodiment of the present invention.

FIG. 18 is a schematic view of an optical device for both a dot sight mode and a scope mode according to a third exemplary embodiment of the present invention. The third exemplary embodiment is the same as the second exemplary embodiment except a position and configuration of the rotation means.

Referring to FIG. 18, a rotation means 60 according to the third exemplary embodiment includes an elastic member 61, a pivot lever 62, and a fixing unit 63.

The elastic member 61 is coupled to the scope shaft 24, and includes one side supported inside the tube body housing 11 and the other side coupled to the pivot lever 62 to be described later.

The pivot lever 62 couples with the scope shaft 24 to rotate the scope shaft 24.

At this time, the elastic member 61 may be installed to be elastically compressed in accordance with the positions of the scope tube body 21 rotated by the pivot lever 62. This accompanying drawing illustrates that the scope tube body 21 is supported by the spring when placed in the dot sight region a.

Also, the fixing unit 63 is disposed in one side of the pivot lever 62 and restricts the rotation of the scope shaft 24 by pressing the scope shaft 24.

Figure 19:
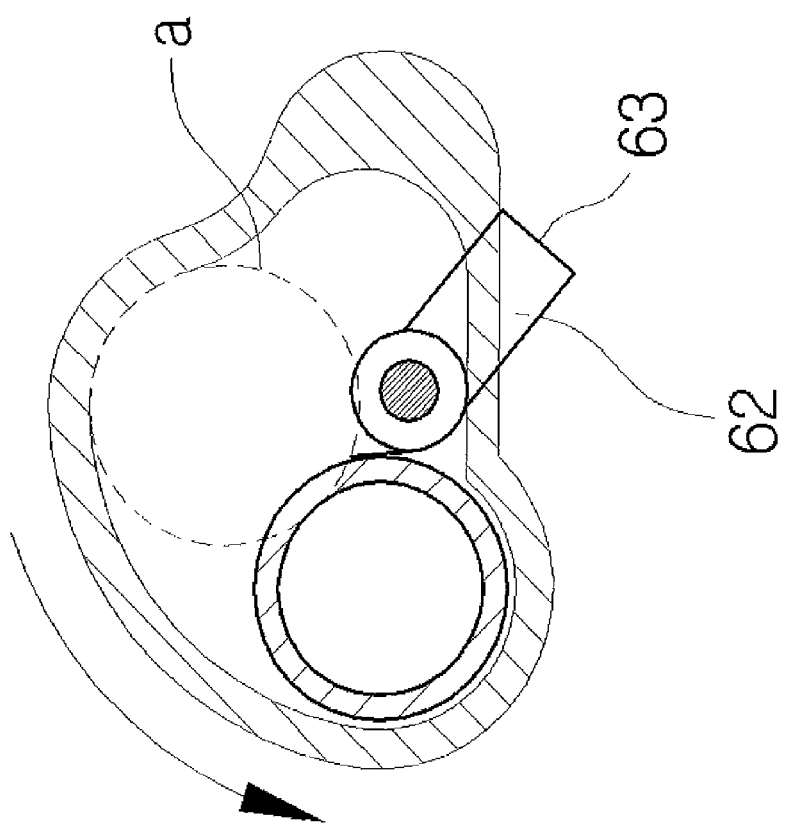

As shown in FIG. 19, when the elastic member 61 is compressed by the rotation of the scope tube body 21, the fixing unit 63 presses the scope shaft 24 and prevents the scope shaft 24 from returning to its original position by the elasticity of the elastic restoring force of the elastic member 61.

Next, an optical device for both a dot sight mode and a scope mode according to a fourth exemplary embodiment of the present invention will be described. The fourth exemplary embodiment is the same as the third exemplary embodiment except a position and configuration of the rotation means.

Figure 20:
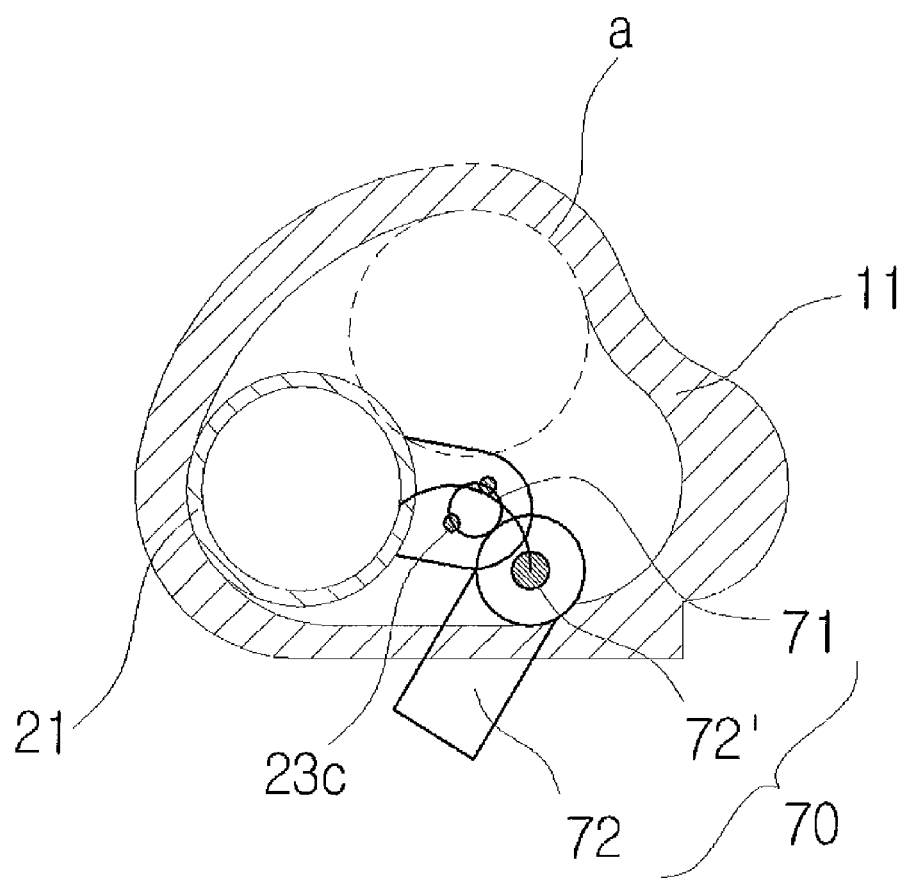
FIGS. 20 and 21 are schematic and operation views of an optical device for both a dot sight mode and a scope mode according to a fourth exemplary embodiment of the present invention.

FIG. 20 is a schematic view of an optical device for both a dot sight mode and a scope mode according to a fourth exemplary embodiment of the present invention.

Referring to FIG. 20, a rotation means 70 according to the fourth exemplary embodiment includes an elastic member 71 and a pivot lever 72.

The elastic member 71 is a leaf spring placed between a pair of supporting parts 23c formed in the boss unit 23, which includes one side coupled to a lever shaft to be described later, and the other side coupled to the tube body housing 21, thereby having a certain curvature with elasticity.

The pivot lever 72 is installed at a lateral side of the scope shaft 24 within the tube body housing 11 so as to rotate with respect to a lever shaft 72'.

Figure 21:
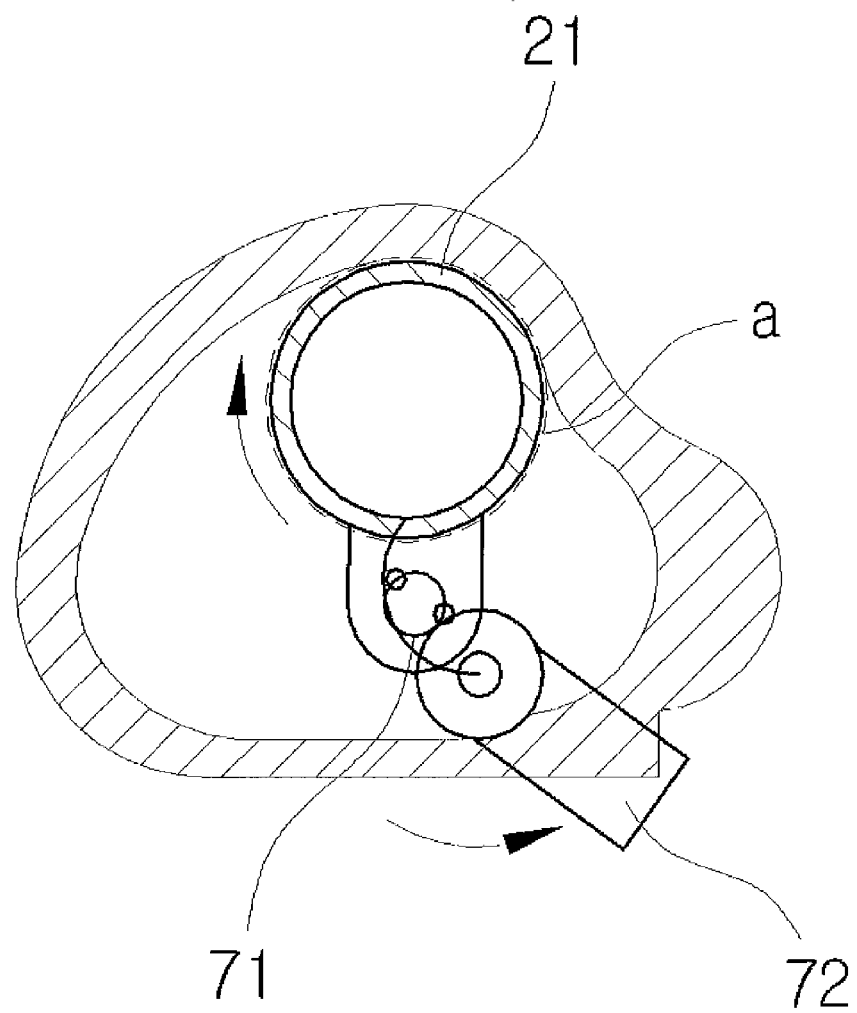

That is, as shown in FIGS. 20 and 21, the scope tube body 21 may be inserted in or come out of the dot sight region a by the elasticity of the elastic member 71 when the pivot lever 72 rotates.

Next, an optical device for both a dot sight mode and a scope mode according to a fifth exemplary embodiment of the present invention will be described. The fifth exemplary embodiment is the same as the third exemplary embodiment except a configuration of the rotation means.

Figure 22:
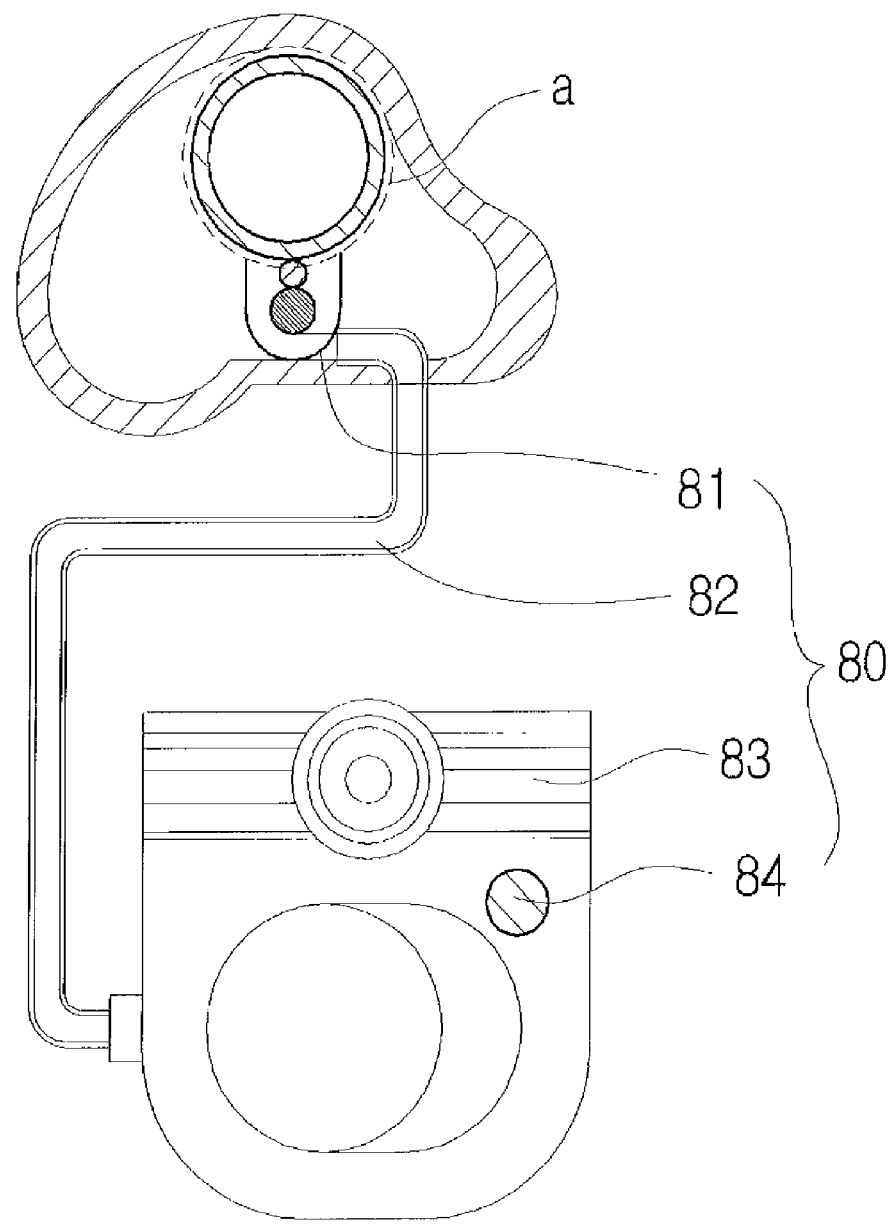
FIGS. 22 and 23 are schematic and operation views of an optical device for both a dot sight mode and a scope mode according to a fifth exemplary embodiment of the present invention.

FIG. 22 is a schematic view of an optical device for both a dot sight mode and a scope mode according to a fifth exemplary embodiment of the present invention.

Referring to FIG. 22, a rotation means 80 according to the fifth exemplary embodiment includes an elastic member 81, a wire 82 and an adjusting unit 83.

The elastic member 81 is coupled to the scope shaft 24, which includes one side supported inside the tube body housing 11 and the other side supported by the scope tube body 21.

The wire 82 has one end coupled to the scope tube body 21 and wound on the scope shaft 24, and the other end coupled to the adjusting unit 83.

The adjusting unit 83 is installed to rotate the tube body housing 11 while unwinding the wire from the scope shaft 24 by pulling the wire 82. At this time the elastic member 81 is configured to be elastically compressed.

Also, the adjusting unit 83 is provided with a fixing unit 84 for fixing the wire 82 pulled to prevent the tube body housing 11 from being elastically restored by the elastic member 81 in the state of coming out of the dot sight region a.

Figure 23:
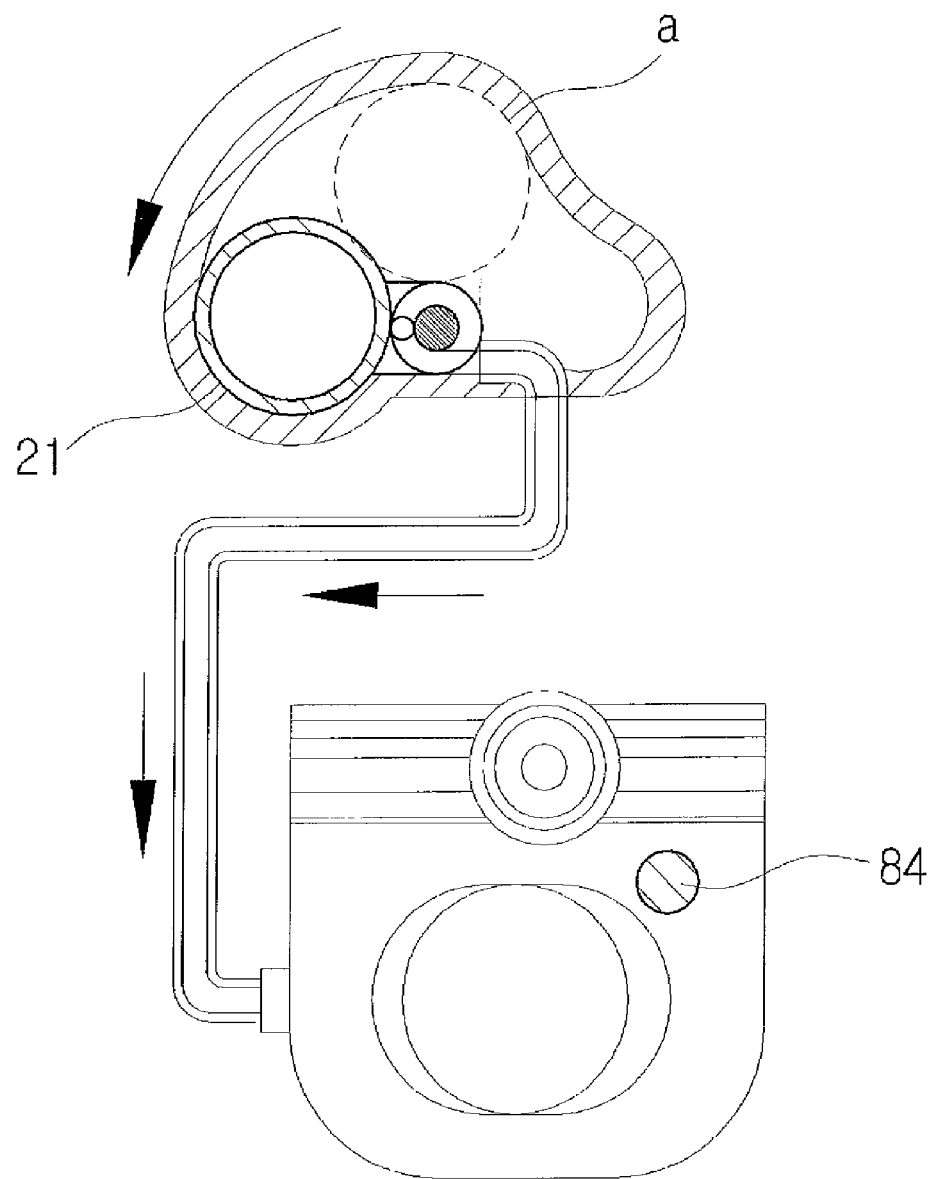

That is, if the adjusting unit 83 pulls the wire 82 in the state as shown in FIG. 22, the tube body housing 11 comes out of the dot sight region a as shown in FIG. 23, so that the optical device can operate in the dot sight mode. If the fixing unit 84 releases the wire 82, the scope tube body 21 is placed in the dot sight region a as shown in FIG. 21 by the elastic restoring force of the elastic member 81, thereby switching into the scope mode.

Next, an optical device for both a dot sight mode and a scope mode according to a sixth exemplary embodiment of the present invention will be described. The sixth exemplary embodiment is the same as the third exemplary embodiment except a configuration of the rotation means.

Figure 24:
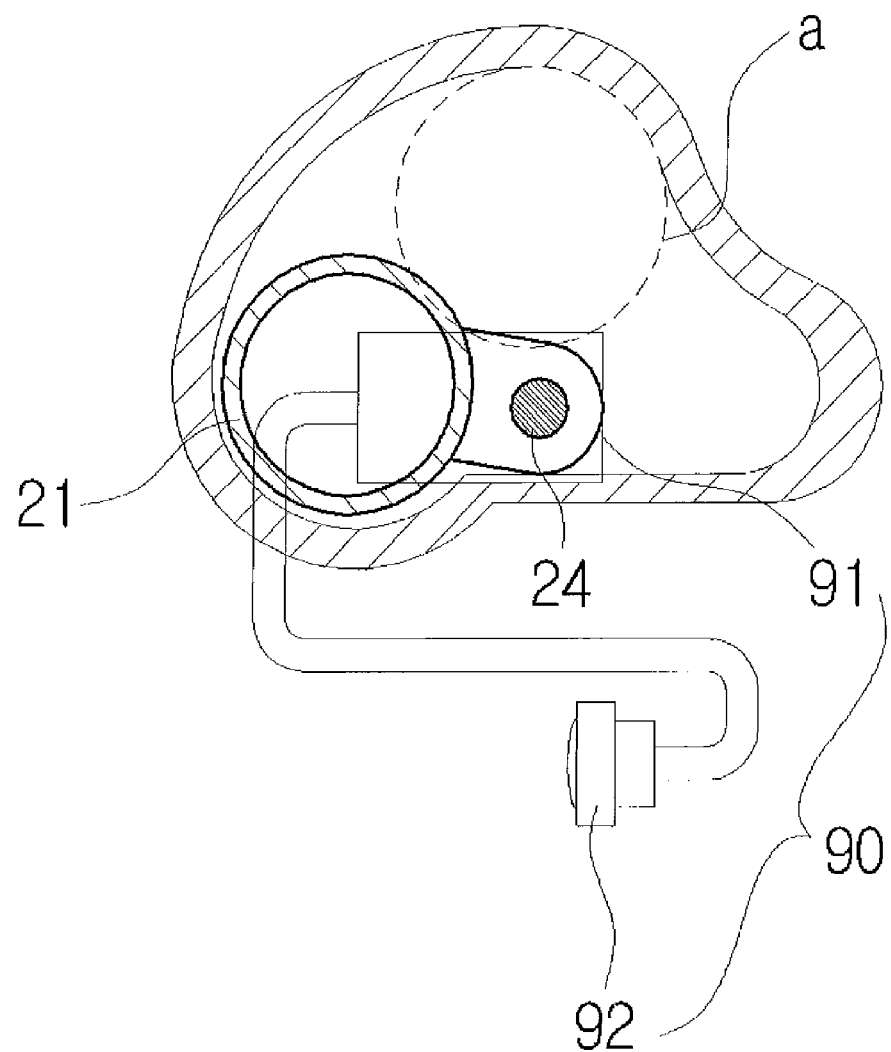
FIGS. 24 and 25 are schematic and operation views of an optical device for both a dot sight mode and a scope mode according to a sixth exemplary embodiment of the present invention.
Figure 25:
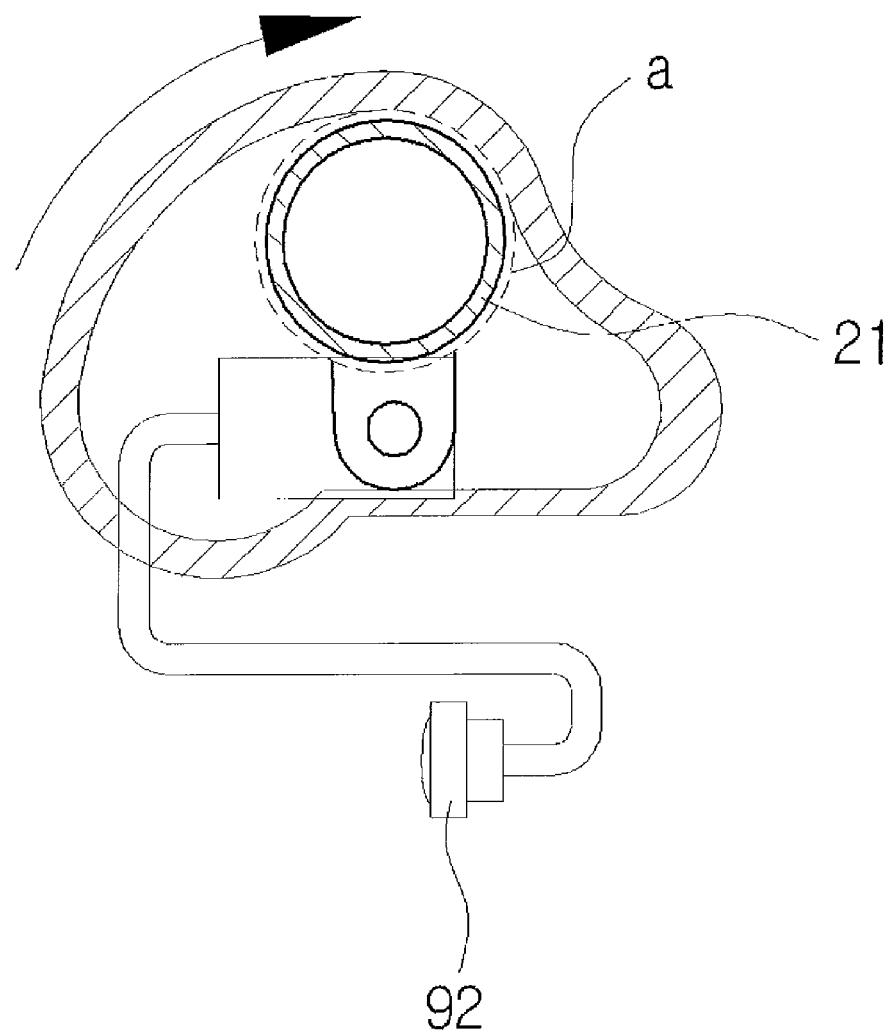

FIG. 24 is a schematic view of an optical device for both a dot sight mode and a scope mode according to a sixth exemplary embodiment of the present invention.

Referring to FIG. 24, a rotation means 90 according to the sixth exemplary embodiment includes a driving motor 91 and a control unit (not shown).

The driving motor 91 is achieved by a stepping motor, a servo motor, or the like, and coupled for rotating the scope shaft 24.

The control unit is provided to control a rotated angle of the driving motor 91, and includes a predetermined switch 92 or the like. Thus, the driving motor 91 is driven through the switch 92 to insert the tube body housing 11 in the dot sight region a as shown in FIG. 24 so as to switch the mode of the optical device into the scope mode and make the tube body housing 11 come out of the dot sight region a so as to switch the mode of the optical device into the dot sight mode.

Next, an optical device for both a dot sight mode and a scope mode according to a seventh exemplary embodiment of the present invention will be described. The seventh exemplary embodiment is the same as the sixth exemplary embodiment except a configuration of the rotation means.

Figure 26:
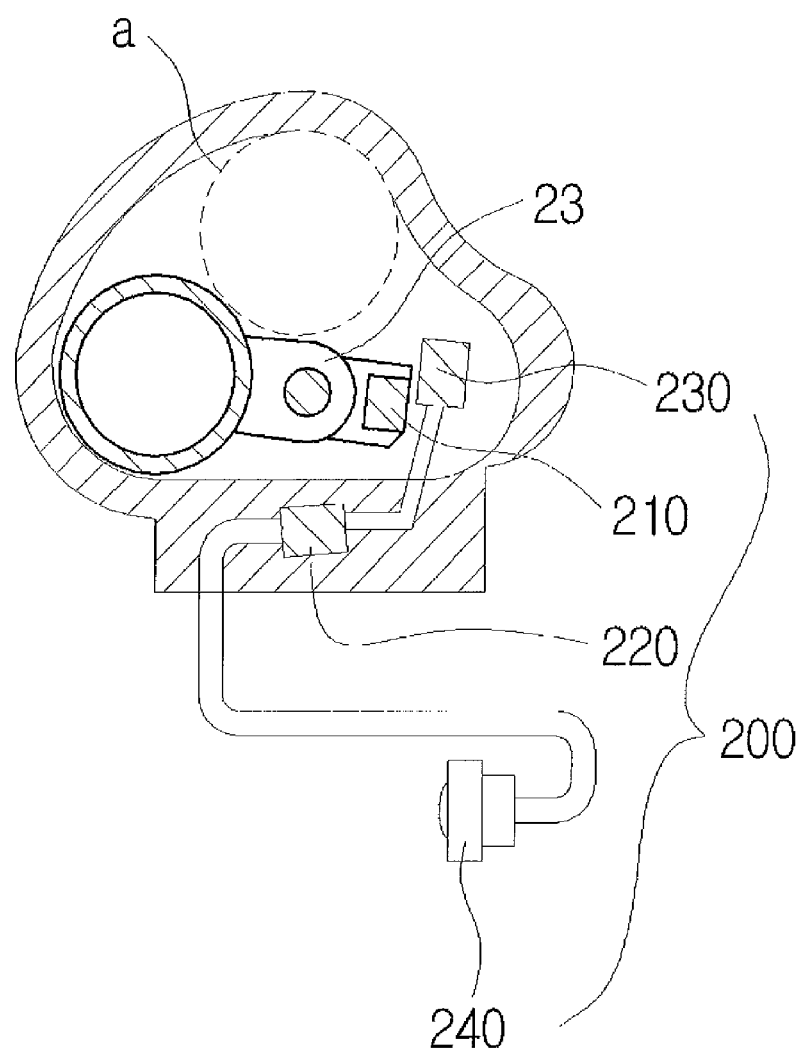
FIGS. 26 and 27 are schematic and operation views of an optical device for both a dot sight mode and a scope mode according to a seventh exemplary embodiment of the present invention.

FIG. 26 is a schematic view of an optical device for both a dot sight mode and a scope mode according to a seventh exemplary embodiment of the present invention.

Referring to FIG. 26, a rotation means 200 according to the seventh exemplary embodiment includes a first terminal 210, a second terminal 220, a third terminal 230 and a control unit 240.

Each terminal is made of predetermined metal or the like, and thus has electric polarity when voltage is applied thereto.

The first terminal 210 is installed in the boss unit 23, and the second terminal 220 and the third terminal 230 are installed inside the tube body housing 11 as being spaced apart from each other, which are connected to the control unit 240 and selectively receive the voltage to have the electric polarity.

The accompanying drawing illustrates that the third terminal 230 has the electric polarity as receiving the voltage and it is thus opposite to the first terminal 210 by attractive force based on electromagnetic force therebetween.

Figure 27:
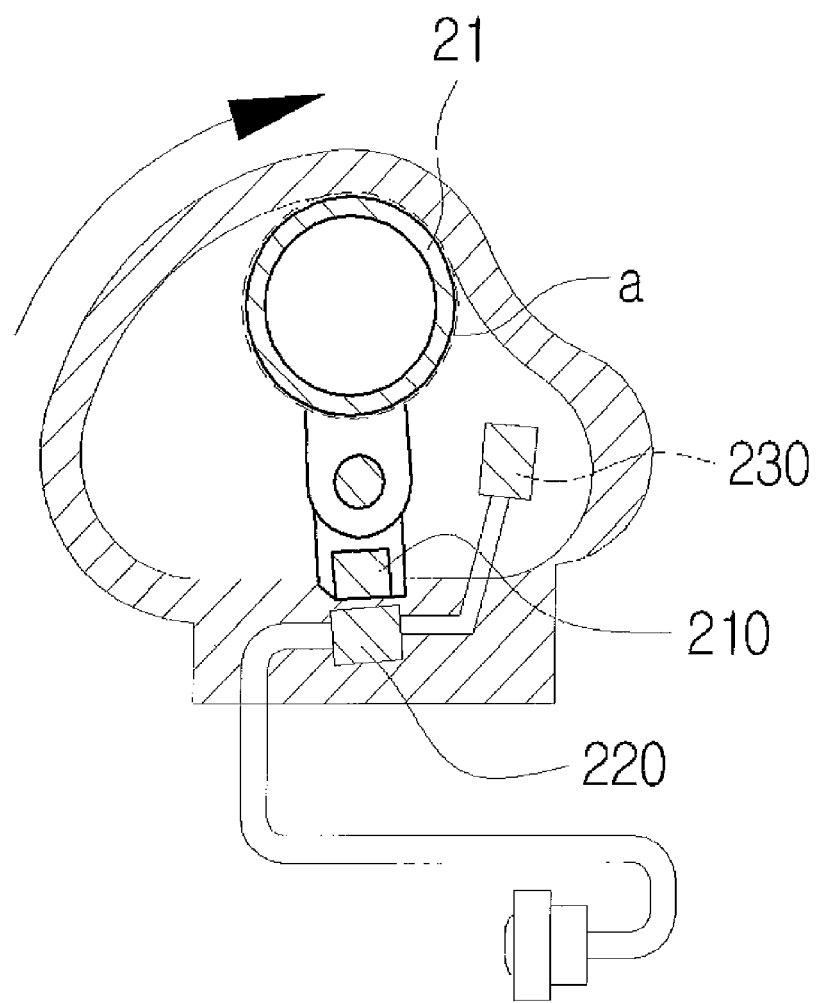

In this state, if voltage is applied to the second terminal 220 instead of the third terminal 230 through the control unit 240, the attractive force between the second terminal 220 and the first terminal 210 causes the first terminal 210 to rotate toward the second terminal 220 as shown in FIG. 27. Thus, the tube body housing 121 is also rotated toward the dot sight region a, thereby switching the mode of the optical device into the scope mode.

In the foregoing embodiment, the voltage is individually applied to the second terminal 220 and the third terminal 230 in order to generate electromagnetic force, but not limited thereto. Alternatively, in the state that the voltage is applied to both the two terminals, the respective terminals may be formed to have different polarities from each other, and the polarities of the respective terminals may be altered through the control unit.

As described above, the second to seventh exemplary embodiments show various rotation means for inserting or drawing the scope structure in or out of the dot sight region.

Next, an optical device for both a dot sight mode and a scope mode according to an eighth exemplary embodiment of the present invention will be described. The eighth exemplary embodiment is the same as the third alternative example of the second exemplary embodiment except configurations of the tube body housing and the boss unit.

Figure 28:
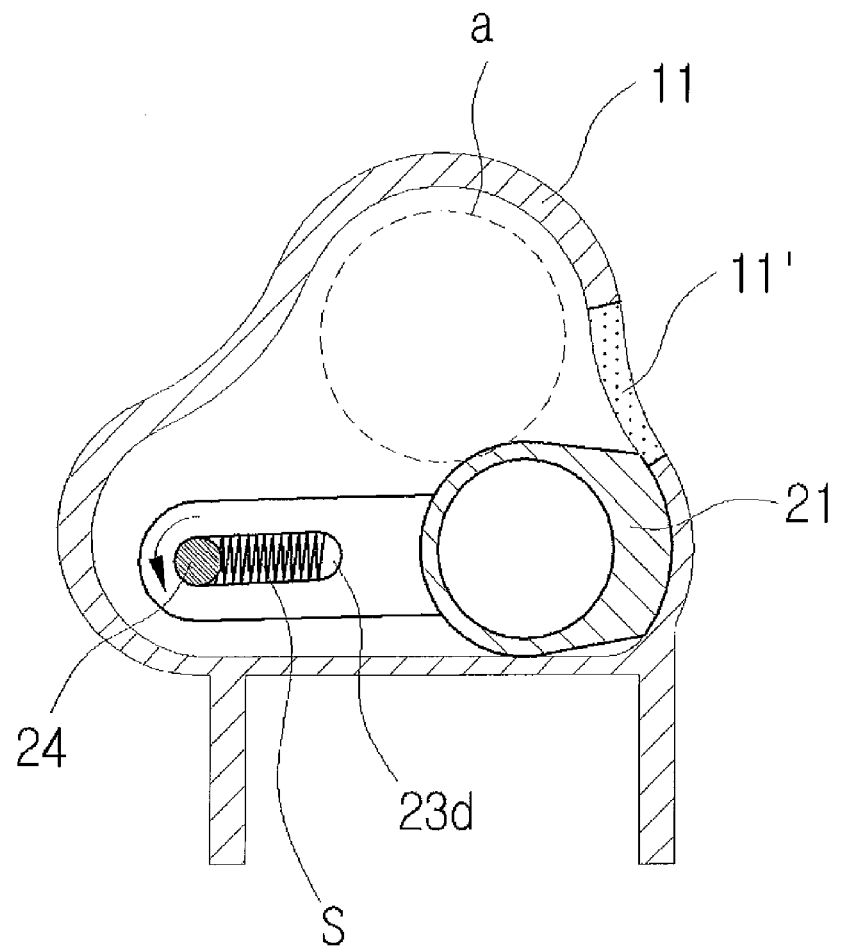
FIGS. 28 to 30 are schematic and operation views of an optical device for both a dot sight mode and a scope mode according to an eighth exemplary embodiment of the present invention.

FIG. 28 is a schematic view of an optical device for both a dot sight mode and a scope mode according to the eighth exemplary embodiment of the present invention.

Referring to FIG. 28, the optical device for both a dot sight mode and a scope mode according to the eighth exemplary embodiment includes a mode switching protrusion 11' protruding from one side of the tube body housing 11 inward.

Also, the boss unit 23 includes an elongated hole 23d formed long in a lengthwise direction of the boss unit 23.

Further, a spring s is installed inside the elongated hole 23d so as to elastically support the scope shaft 24 when the scope shaft 24 to be coupled moves along the elongated hole.

At this time, the outer surface of the scope tube body 21 is formed to come in contact with the tube body housing 11. Also, a pivot lever (not shown) is coupled to a certain region of the scope shaft 24 and rotates the scope shaft 24.

Figure 29:
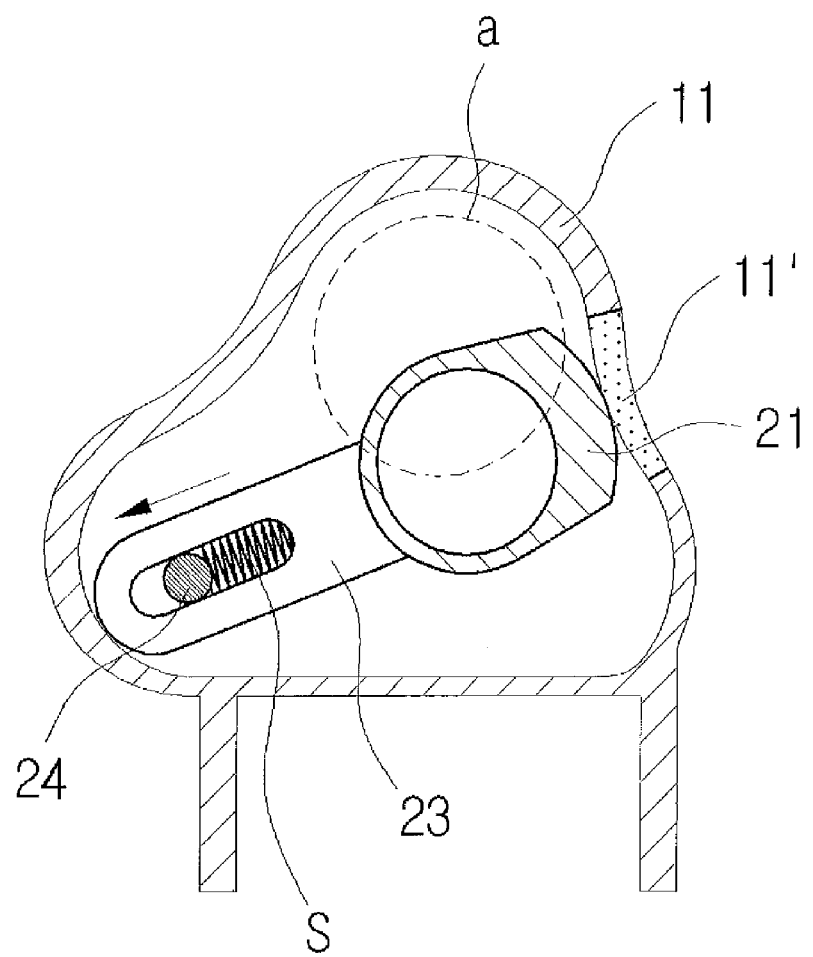

In such a coupled state, if the scope shaft 24 rotates counterclockwise, the scope tube body 21 moves along an inner surface of the tube body housing 11, and the boss unit 23 moves along the elongated hole 23d when the scope tube body 21 comes in contact with the protrusion 11' as shown in FIG. 29 while moving. At this time the spring s is elastically compressed by the scope shaft 24.

Figure 30:
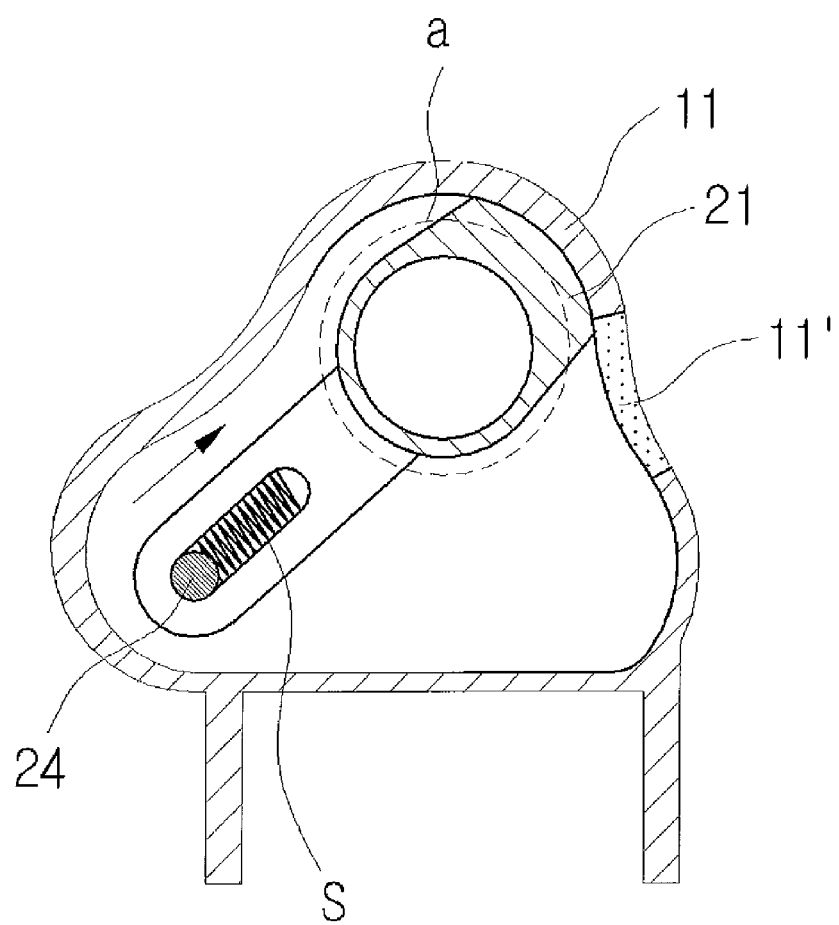

Then, as shown in FIG. 30, if the scope tube body 21 passes through the protrusion 11', the elastic restoring force of the spring s presses the inner surface of the elongated hole 23d facing toward the scope tube body 21, so that the scope tube body 21 is placed in the dot sight region a, thereby switching to the scope mode.

On the same principle, the switching to the dot sight mode is achieved when the scope shaft 24 rotates in a direction opposed to the foregoing direction.

With this method, the switching from the dot sight mode to the scope mode or from the scope mode to the dot sight mode is easily, quickly and precisely performed.

In the foregoing second to eighth exemplary embodiments as opposed to the first exemplary embodiment, there is no position control means. Thus, the elastic member involved in the rotation means is configured to have proper elasticity, or the driving motor, the electromagnetic force, the protrusion, and the like structure are used to rotate the scope tube body, so that the scope tube body can be precisely rotated and inserted in the dot sight region without a separate position control means.

Meanwhile, all the first to eighth exemplary embodiments disclose the reflective mirror inside the reflective mirror housing provided in the dot-sight main body. Below, a doublet configuration of the reflective mirror will be described.

Figure 31:
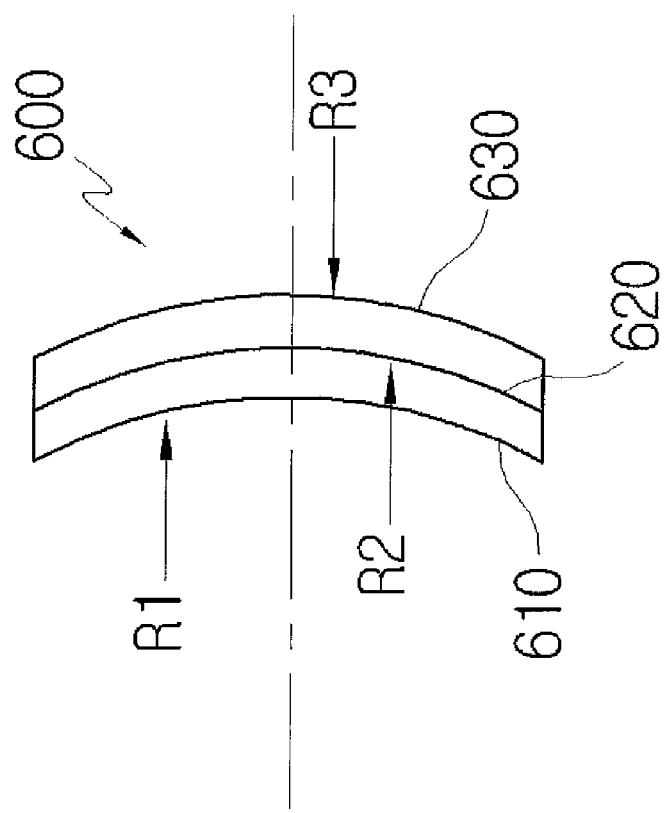
FIGS. 31 and 32 are schematic views of a reflective mirror applied to the first to eighth exemplary embodiments.
Figure 32:
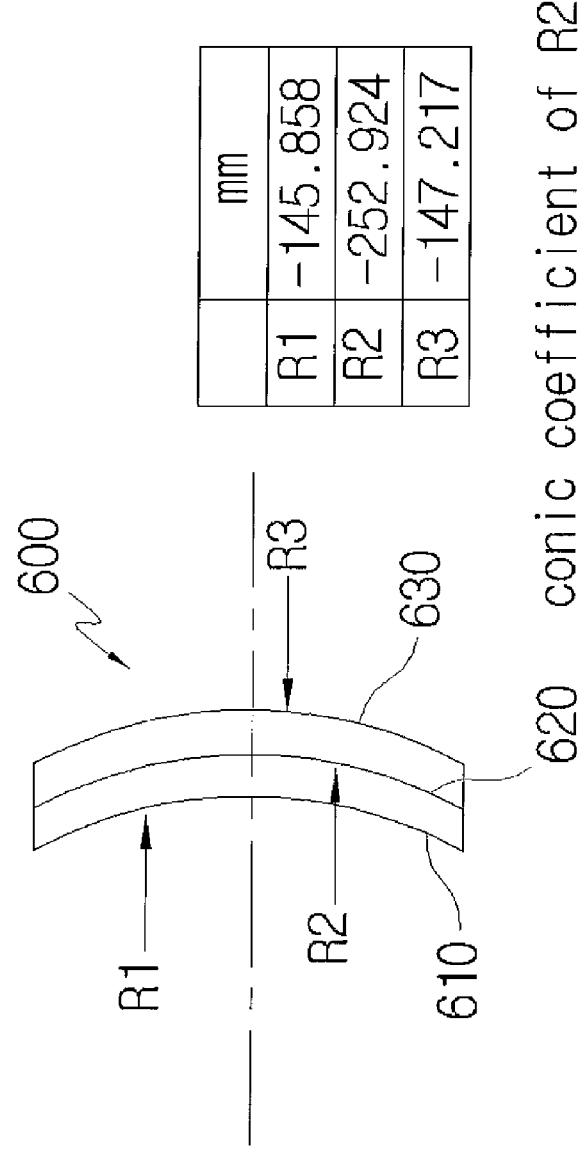

FIGS. 31 and 32 are schematic views of a reflective mirror applied to the first to eighth exemplary embodiments. Referring to FIGS. 31 and 32, a distance between the LED as the light source unit installed inside the tube body housing 11 and a reflective surface was set to 200 mm, a central thickness was set to 4.0 mm.

An LED dot is reflected from a surface $R_2$, i.e., a second surface 620 of the reflective mirror 600, in which the LED dot passes through a surface $R_1$, i.e., a first surface 610 when entering; is reflected from the surface $R_2$, i.e., the second surface 620; and enters an observer's eyes via the surface $R_1$, i.e., the first surface 610. That is, since the LED dot passes through a variable surface $R_1$ twice and passes through a variable surface $R_2$ once, more degrees of freedom is given in light of design. Therefore, it is possible to further minimize parallax.

To reduce generation of magnification when an external target is formed on an observer's eyes, an afocal system was configured. Such a configuration is applied to curvatures of the first surface 610 and a third surface 630 on the basis of the following (expression 1).

If a distance (i.e., a central thickness) between the first surface 610 and the third surface 630 of the doublet is d, the curvature of the first surface 610 is $R_1$, the curvature of the third surface 630 is $R_3$, and a reflective index of material is n, the following (expression 1) is achieved.

$$D_1 = \frac{n-1}{R_1}, D_2 = \frac{1-n}{R_3} \quad \text{(Expression 1)}$$

$$D_1 + D_2 - \frac{d}{n}D_1 D_2$$

At this time, $D_1$ indicates the refractive index of the first surface 610, and $D_3$ indicates the refractive index of the first surface 630.

With this configuration, the parallax was improved by 80% or more.

Meanwhile, if the second surface 610 is an aspheric surface having a conic coefficient, the parallax can be more minimized. At this time, there was an effect of improving the parallax by 90% or more as compared with that of FIG. 12.

Figure 33:
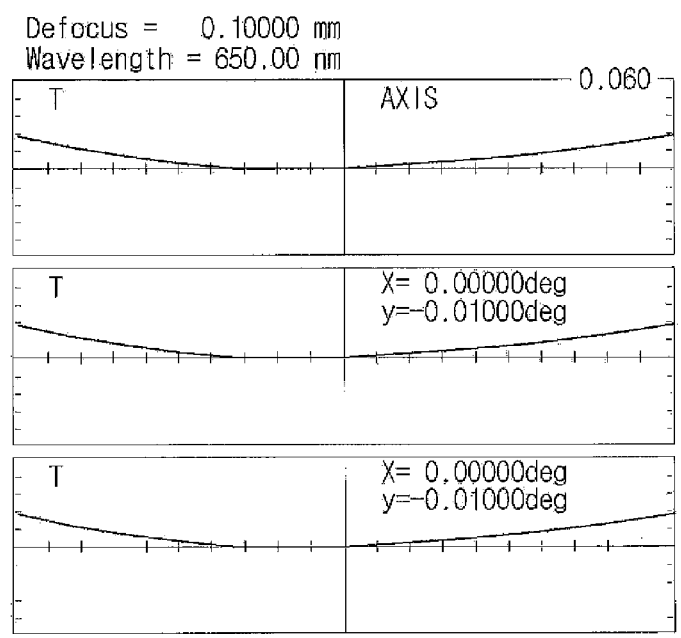
FIGS. 33 to 35 are three graphs that show aberration of a tangential ray in the cases of a single reflective surface, a doublet surface, and a doublet surface having a conic aspheric reflective surface between two lenses, respectively.
Figure 34:
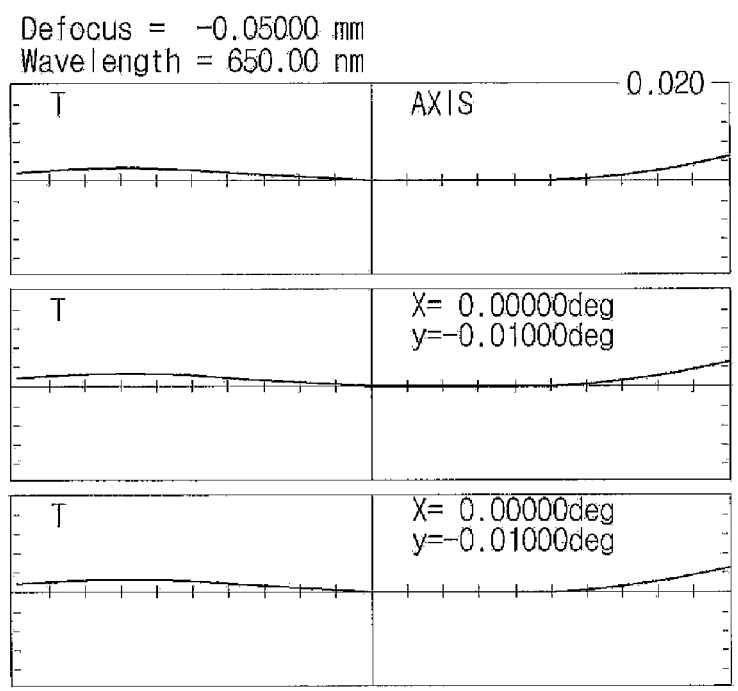
Figure 35:
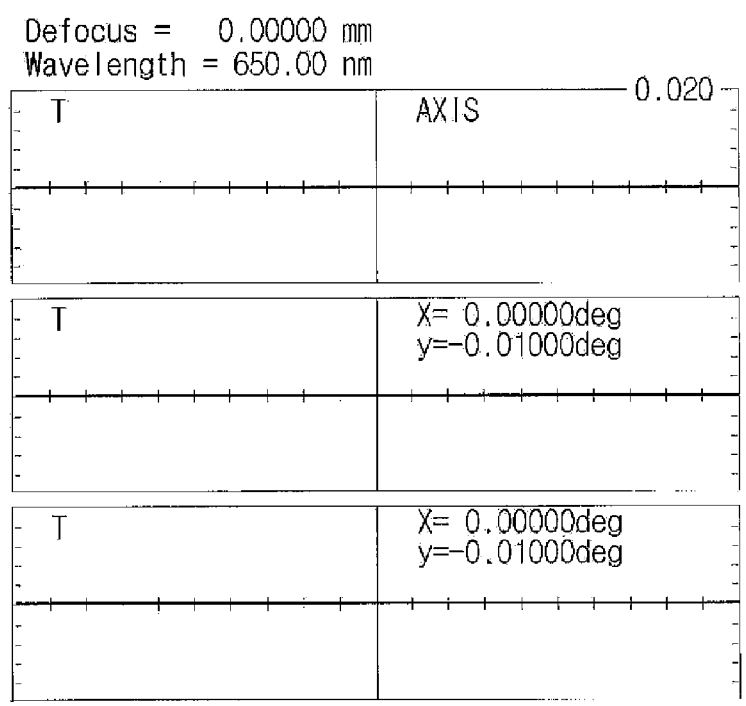

FIGS. 33 to 35 are three graphs that show aberration of a tangential ray in the cases of the existing single reflective surface, a doublet surface (a spherical reflective surface between two lenses), and a doublet surface having a conic aspheric reflective surface between two lenses, respectively. Each leans has an inclination angle of −0.2 degrees.

Among the graphs shown in FIGS. 33 to 35, the graph of FIG. 33 shows spherical aberration, which shows no parallax if the spherical aberration is aligned with an X axis. In the case of the existing single reflective surface, the maximum aberration is 0.02 mm. In the case of employing a spherical reflective surface as a middle surface of the doublet, the maximum aberration is 0.004 mm. In the case of employing a conic aspheric reflective surface as the middle surface of the doublet, the maximum aberration is 0.0004 mm.

Accordingly, if 50% central space was regarded as an effective surface in the whole region, it was calculated that there was at least 80% or more improvement in comparison between the existing single reflective surface and the spherical reflective surface employed as the middle surface of the doublet (i.e., comparison with respect to an integrated value of spherical aberration (the y axis) to the x axis (effective space where an LED beam is reflected)). Further, it was calculated that there was at least 90% or more improvement in comparison between the spherical reflective surface employed as the middle surface of the doublet and the conic aspheric reflective surface employed as the middle surface of the doublet.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

Optical devices, applied to a firearm corresponding to a precision instrument, have been separately manufactured for a scope mode and a dot sight mode, respectively, or even though the optical devices for both the scope mode and the dot sight mode are manufactured as a single body, it is nothing but that they are just coupled to one housing. However, according to an exemplary embodiment of the present invention, a scope structure is inserted in a dot sight region applied for the dot sight mode, so that the size and weight of the optical device can be reduced, and it can be thus applied to a personal weapon.

The invention claimed is:

1. An optical device for both a dot sight mode and a scope mode, the optical device comprising:
a dot-sight main body which is formed with a dot sight region where a light source and a reflective mirror are installed to display light emitted from the light source as a dot on an external target, and operates in the dot sight mode; and
a scope structure which comprises an objective lens and an eyepiece lens to magnify and see the external target, and is rotatable inside the dot-sight main body,
the scope mode being selected when the scope structure is rotated and inserted in the dot sight region.

2. The optical device according to claim 1, wherein the scope structure comprises a scope tube body in which the objective lens and the eyepiece lens are installed, and a scope shaft installed to be rotatable inside the dot-sight main body and rotating the scope tube body as being coupled with the scope tube body.

3. The optical device according to claim 2, wherein the scope tube body comprises a tube body unit in which the objective lens and the eyepiece lens are installed, and a boss unit formed to be coupled with the scope shaft.

4. The optical device according to claim 3, further comprising a means for rotation which is installed at one side of the scope structure and rotates the scope structure.

5. The optical device according to claim 4, wherein the means for rotation comprises a rotation unit coupled to and interlocking with the scope shaft, an interlock unit coupled to and interlocking with the rotation unit, and a pivot unit installed in the dot-sight main body and rotating the interlock unit as being coupled to and interlocking with the interlock unit.

6. The optical device according to claim 5, further comprising a means for position control which is disposed at one side of the scope structure, and controls an inserting position so that the scope tube body is placed in the dot sight region when the scope tube body rotates.

7. The optical device according to claim 6, wherein the means for position control comprises
a first stopper which is coupled to and interlocks with the scope shaft;
a second stopper which formed with a recessed receiving groove to receive the first stopper and comes in contact with the first stopper received in the receiving groove; and
a spring which is coupled to the second stopper and supported inside the dot-sight main body, and elastically supports the second stopper pressed as the first stopper received in the receiving groove rotates.

8. The optical device according to claim 4, wherein the means for rotation further comprises an elastic member which makes the scope structure rotate by elastic restoring force when the scope structure rotates toward the dot sight region of the dot-sight main body.

9. The optical device according to claim 8, wherein
the boss unit of the scope tube body is formed with a recessed supporting groove, and
the means for rotation further comprises a rotation unit rotating with respect to a lever shaft formed inside the dot-sight main body and supporting one side of the supporting groove to elastically compress the elastic member.

10. The optical device according to claim 8, wherein
the boss unit of the scope tube body is formed with a recessed supporting groove, and
the means for rotation comprises a rotation unit installed to be movable inward and outward with regard to the dot-sight main body, and presses one side of the supporting groove to elastically compress the elastic member when the rotation unit moves inward.

11. The optical device according to claim 8, wherein the means for rotation further comprises a pivot lever coupled to the scope shaft and rotating the scope shaft, and a fixing unit coupled to the pivot lever and restricting rotation of the scope shaft when the elastic member is elastically compressed in accordance with positions of the scope tube body.

12. The optical device according to claim 8, wherein the means for rotation comprises a pivot lever rotation with respect to a lever shaft formed inside the dot-sight main body, and the elastic member comprises a leaf spring having one side coupled to the lever shaft and the other side coupled to the scope tube body and elastically biased in one direction, the scope tube body being rotated by elasticity of the leaf spring when the pivot lever rotates.

13. The optical device according to claim 8, wherein the means for rotation comprises a wire having one end wound on the scope shaft, and an adjusting unit coupling with the other end of the wire and rotating the scope tube body by adjusting the length of the wire.

14. The optical device according to claim 8, wherein the adjusting unit further comprises a fixing unit configured to fix the wire when the elastic member is elastically compressed in accordance with rotated positions of the scope tube body.

15. The optical device according to claim 4, wherein the means for rotation comprises a driving motor coupled to rotate the scope tube body toward the dot sight region.

16. The optical device according to claim 4, wherein the means for rotation comprises a first terminal installed in the boss unit, and second and third terminals having electric polarities and installed within the dot-sight main body, and the scope tube body is rotated by electromagnetic force between the first terminal and the second terminal and electromagnetic force between the first terminal and the third terminal.

17. The optical device according to claim 4, wherein
a mode switching protrusion is formed inside the dot-sight main body and guiding a rotated position of the scope tube body,
the boss unit of the scope tube body is formed with an elongated hole formed long in a lengthwise direction of the boss unit to move the scope shaft along the boss unit, and
a spring is installed inside the elongated hole and elastically supports the scope shaft to move toward the scope tube body when the scope tube body comes in contact with the protrusion.

* * * * *